(12) United States Patent
Iribe et al.

(10) Patent No.: US 6,998,809 B2
(45) Date of Patent: Feb. 14, 2006

(54) ROBOT APPARATUS, AND LOAD ABSORBING APPARATUS AND METHOD

(75) Inventors: Masatsugu Iribe, Tokyo (JP); Hajime Yamanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 11/098,390

(22) Filed: Apr. 5, 2005

(65) Prior Publication Data

US 2005/0168184 A1    Aug. 4, 2005

Related U.S. Application Data

(63) Continuation of application No. 10/731,145, filed on Dec. 10, 2003.

(30) Foreign Application Priority Data

Dec. 18, 2002 (JP) .............................. 2002-367353
Oct. 28, 2003 (JP) .............................. 2003-367477

(51) Int. Cl.
   *F16D 7/00*    (2006.01)
   *G05B 11/01*   (2006.01)
(52) U.S. Cl. ................. 318/568.12; 318/611; 318/623; 318/632
(58) Field of Classification Search ........... 318/568.11, 318/568.12, 568.2, 568.22, 611, 623, 625, 318/632, 646; 901/9, 27, 28, 48, 49
See application file for complete search history.

(56) References Cited

U.S. PATENT DOCUMENTS

| 4,175,727 | A |   | 11/1979 | Clarke |
| 5,086,491 | A |   | 2/1992 | Cuneo |
| 5,426,586 | A | * | 6/1995 | Ozawa ......................... 701/23 |
| 5,445,235 | A | * | 8/1995 | Gomi et al. ................. 180/8.6 |
| 5,709,350 | A |   | 1/1998 | Davis et al. |
| 5,796,229 | A |   | 8/1998 | Akeel |
| 6,289,265 | B1 | * | 9/2001 | Takenaka et al. ........... 700/245 |
| 6,538,410 | B1 | * | 3/2003 | Mori et al. ............ 318/568.12 |
| 6,564,888 | B1 | * | 5/2003 | Gomi et al. ................. 180/8.6 |

* cited by examiner

*Primary Examiner*—Bentsu Ro
(74) *Attorney, Agent, or Firm*—Oblon, Spivak, McClelland, Maier & Neustadt, P.C.

(57) ABSTRACT

To appropriately detect overload which may break a motor or deform a body and reduce the overload in the motor. The DC component of a load torque is derived from the sum of absolute values of a torque applied to a link connected to the output shaft of a motor and the generated torque of the motor, and it is determined that overload has been applied when the DC component exceeds a first threshold value for a prescribed period of time or longer. In addition, considering such a characteristic that the variation of energy applied to the output shaft of a motor is in proportion to a product of the torque and the angular velocity of the motor, the AC component of the load torque is detected based on the variation of energy, and it is predicted that overload will be applied when the AC component exceeds a second threshold value.

1 Claim, 31 Drawing Sheets

OBSTACLE TO STANDING-UP

ROBOT APPARATUS, AND LOAD ABSORBING APPARATUS AND METHOD

CROSS REFERENCE TO RELATED APPLICATIONS

This application is a continuation of application Ser. No. 10/731,145, filed Dec. 10, 2003, the entire contents of which are incorporated herein by reference.

BACKGROUND OF THE INVENTION

1. Field of the Invention

This invention relates to a robot apparatus, and a load absorbing apparatus and method for absorbing load applied to a motor, and specifically, to a robot apparatus, and a load absorbing apparatus and method for motors which are used as actuators for joint motion of a multi-joint type robot.

For more detail, this invention relates to a robot apparatus, and a load absorbing apparatus and method for appropriately detecting and controlling overload which is applied to a motor and may break the motor or deform the body of the robot apparatus, and more specifically, to a robot apparatus, and a load absorbing apparatus and method, which are applied to a multi-joint type robot comprising a plurality of actuator motors in order to prevent breakage of members and the body due to overload applied to the motors having a single or multiple axes.

2. Description of the Related Art

"Robot" is a mechanical apparatus which performs like human beings, with electrical or magnetic functions. This term "robot" is said to be originated from "ROBOTA (slave machine)" in Slavic. In Japan, robots were started to be spread in the late 1960s, and many of them were industrial robots such as manipulators and carrier robots for automated and unmanned factories. However, recent development relating to two-legged walking robot have been highly expected to be put to practical use. Specifically, the two-legged walking robot which is modeled after human motion is called humanoid robot.

As compared with crawler, four-leg, or six-leg type robots, two-leg type robot is unstable when moving, and its posture and walking are hard to be controlled. However, the two-leg type robot is capable of waking on uneven floors and going up and down steps and ladders, which is an advantage.

This kind of two-legged walking robot generally has a degree of freedom in many joints and these joints are moved by actuator motors. That is, a motor's output shaft is connected to one end of a link composing a part such as an arm or a leg, via a reduction gear, and the other end of the link is connected to a motor for next-joint motion. In order to realize desired performance and postures, servo control is performed based on the rotational position and rotational amount of each motor.

In general, a servo motor is used for realizing a degree of freedom in a joint of a robot, because it is easy to use, it is compact and has high torque, and it is superior in response. Specifically, an AC servo motor is brushless and maintenance free, so that it can be applied to an automated machine which is desired to work in unmanned working space, for example, to a joint actuator of a legged robot which walks freely. With a rotor comprising a permanent magnet and a stator consisting of multi-phase (for example, three-phase) coil windings, the rotor of the AC servo motor produces rotary torque with a sine wave flux distribution and a sine wave current.

Advanced two-legged walking robot autonomously walks and moves. In addition, this robot is capable of standing up from a lying position and holding and carrying objects with its arms. On the other hand, overload may be applied to its joint actuators when it falls down, bumps against something, and gets something into its body.

Such overload may cause fatal damage, for example, breakage or plastic deformation of its body. Therefore, what is crucial is that each motor constituting a joint actuator is provided with a mechanism for absorbing load.

FIG. 1 shows a simple robot model. That is, the robot drives a motor 120 under the control of a higher-ranked controller not shown, and gives output torque to a link 122 via a gear 121, so as to move a movable part.

In this figure, a torque limiter is provided between the gear 121 and the link 122, in order to absorb shocks to be given from the outside to the link 122, thereby being capable of previously preventing breakage of the motor 120 and so on, caused by the shocks, such as deformation of the output shaft of the motor 120.

Various kinds of torque limiters (or servo savers) have been proposed (for example, refer to Japanese Patent Laid Open No. 60-192893). FIG. 2 shows one example of the torque limiters.

In a torque limiter 130 of this figure, first and second semicircular friction plates 132A and 132B are arranged inside a ring 131 fixed to a link 135. These first and second friction plates 132A and 132B are fixed to the output shaft 134 of a motor via elastic material 133 such as rubber or compression coil springs and are pressed against the ring 131 by a fixed pressure caused by the elastic material 133.

In this torque limiter 130, the ring 131 can be generally rotated together with the output shaft 134 of the motor by frictional force generated between the first and second friction plates 132A and 132B and the ring 131. However, when load greater than static friction force between the first and second friction plates 132A and 132B and the ring 131 is applied to the ring 131 due to a shock applied to the rink 135, the ring 131 and the first and second friction plates 132A and 132B slip on each other, so as not to cause load greater than kinetic friction force between the ring 131 and the first and second friction plates 132A and 132B, in the output shaft 134 of the motor.

This conventional torque limiter 130, however, has a problem in that static friction coefficients between the ring 131 and the first and second friction plates 132A and 132B vary easily and widely, so that it is difficult to determine an allowable margin at the time of designing a robot.

Further, in the conventional torque limiter 130, the static friction coefficients between the ring 131 and the first and second friction plates 132A and 132B vary easily depending on temperature, which is also a problem.

Furthermore, since the conventional torque limiter 130 is constructed mechanically as described above, it is hard to construct a smaller and lighter torque limiter and to therefore realize a smaller and lighter robot which contains motors.

SUMMARY OF THE INVENTION

In view of the foregoing, an object of this invention is to provide an advanced robot apparatus, and a load absorbing apparatus and method for motors which are used as actuators for joint motion of a multi-joint type robot.

An additional object of this invention is to provide an advanced robot apparatus, and a load absorbing apparatus and method, which are capable of appropriately detecting overload which may break a motor and deform the body, and reducing the overload in the motor.

An additional object of this invention is to provide an advanced robot apparatus, and load absorbing apparatus and method, which are capable of appropriately preventing breakage of members and the body due to overload applied to motors having a single or multiple axes, in a multi-joint type robot comprising a plurality of actuator motors.

As the first aspect, the foregoing objects and other objects of the invention have been achieved by a robot apparatus having a plurality of movable joints, the robot apparatus comprising a plurality of motors for driving the joints, a plurality of first overload detection means for detecting overload in the corresponding motor, a load absorbing control means for, when any of the first overload detection means detects the overload in the corresponding motor, controlling a process to absorb the overload in the motor, a second overload detection means for determining whether loads in two or more motors are totally excessive, and a body protection control means for, when the second overload detection means detects the totally overload, carrying out a prescribed body protection operation.

Multi-joint type robot including two-legged walking robot is constructed by a plurality of motors for joint actuators and links connected to the output shafts of the motors. In this construction, it may happen that loads in the plurality of motors are totally excessive even the load in each motor is not excessive. For this case, it is considered that a body protection operation for removing the overload state from the entire body is required, separately from a load absorbing operation for each motor.

In the robot apparatus of the first aspect of this invention, the second overload detection means is provided so that it is detected whether any part such as an arm or a leg, or the entire body is in an overload state even each motor is not in an overload state. When loads in a plurality of motors are totally excessive, not the load absorbing operation for each motor but the body protection operation is carried out.

The body protection operation here includes cutoff of power to relevant motors or all motors of the body and weakening of the relevant motors or all motors of the body. The weakening of a motor is realized by setting its generated torque to zero or decreasing its viscosity resistance by servo gain adjustment.

Further, as a second aspect, a load absorbing apparatus for absorbing load applied to a motor comprises a torque measuring means for measuring a load torque based on the sum of absolute values of a torque applied to a link connected to the output shaft of the motor and the generated torque of the motor, an overload detection means for determining that overload has been applied when the load torque detected by the torque measuring means exceeds a first threshold value for a prescribed period of time or longer, and a load absorbing control means for absorbing the overload in the motor when the overload detection means detects the overload.

Still further, as a third aspect of this invention, a load absorbing apparatus for absorbing load applied to a motor comprises a kinetic energy measuring means for measuring kinetic energy given to the output shaft of the motor, an overload detection means for determining that overload will be applied when the variation of the kinetic energy measured by the kinetic energy measuring means exceeds a second threshold value, and a load absorbing control means for avoiding the overload in the motor when the overload detection means detects the overload.

Still further, as a fourth aspect of this invention, a load absorbing apparatus for absorbing load applied to a motor comprises a torque measuring means for measuring a load torque based on the sum of absolute values of a torque applied to a link connected to the output shaft of the motor and a generated torque of the motor, a kinetic energy variation measuring means for measuring the variation of kinetic energy given to the output shaft of the motor, an overload detection means for detecting overload based on the load torque measured by the torque measuring means and the variation of kinetic energy measured by the kinetic energy variation measuring means, and a load absorbing control means for absorbing the overload in the motor when the overload detection means detects the overload.

Multi-joint type robot including two-legged walking robot is generally constructed by a plurality of motors for joint actuators, and links connected to the output shafts of the motors. Now, assume that overload is applied to motors of the joint actuators when the robot falls down, dumps into something, or gets something into the body while walking or moving. The overload may cause fatal damage such as breakage or plastic deformation of the body (breakage of a link, dropout of a teeth of a reduction gear).

Load torque to be applied to a motor for a joint actuator is broadly classified into impulsive "shock load" which incurs distortion energy and may break members such as links, due to bumping or the like and "constant load" which is relatively high load torque, although not so high as the shock load, and is constantly applied for a prescribed period of time or longer and thereby causes plastic deformation. The inventors of this invention position the shock load and the constant load as AC component and DC component, respectively.

According to the second aspect of this invention, constant load, that is, the DC component of the load torque is detected based on the sum of absolute values of the torque to be applied to a link connected to the output shaft of the motor and the generated torque of the motor, and then it is recognized that the DC component of the load is excessive when the load torque exceeds the first threshold value for a prescribed period of time or longer. Since motor torque is in proportion to motor conducting current, the torque can be measured by converting motor current into a voltage.

The first threshold value here is a value around the stall torque of the motor being used or a threshold value such as a limitation for circuit protection.

Then, in order to avoid the breakage due to the constant load, a prescribed load absorbing operation can be carried out, for example, the generated torque of the motor is reduced or the viscosity coefficient of the motor is decreased. Such load absorbing apparatus realizes a small variation of motor viscosity coefficients among parts and further is lightly affected by temperature. In addition, the torque detection can be carried out by a simple process, which can realize a smaller and lighter robot apparatus even it contains motors.

Further, according to the third aspect of this invention, a load torque is detected based on the variation of kinetic energy, considering such characteristic that the variation of kinetic energy given to the output shaft of a motor is in proportion to a product of a torque applied to the motor and its angular velocity, and then it can be predicted that the AC component of the load will be excessive when the load torque exceeds the second threshold value which may break members.

Then, in order to avoid breakage due to the shock load, a prescribed load absorbing operation can be carried out, for example, the generated torque of the motor is reduced or the viscosity coefficient of the motor is decreased. Such load absorbing apparatus has a small variation of viscosity coefficients among parts and is lightly affected by temperature. In addition, the torque is detected by a simple process, which can realize a smaller and lighter robot apparatus even it contains motors.

Since the AC component of load torque is impulsive, overload is applied at a moment and therefore the load absorbing operation may not be done in time. If based on the aforementioned characteristic in which the variation of kinetic energy is in proportion to a torque applied to the motor and its angular velocity, the overload can not be detected until the torque reaches an overload state. This is a problem in response.

For this problem, such process can be effective that, not the variation of kinetic energy is measured simply, but the kinetic energy is double-differentiated with respect to time, with the result that it is predicted that the AC component will become excessive when the inclination of the variation is a prescribed value or more, and then a load absorbing operation is performed.

In addition, the double differentiation can be approximated by a product of the rate of change of a torque and the angular velocity. On the other hand, considering a characteristic in which motor torque is in proportion to motor current, the torque can be measured by converting the motor current into a voltage, so that the rate of change of the torque can be measured via the time differentiation of the voltage.

Still further, in the load absorbing apparatus according to the fourth aspect of this invention, a load absorbing operation can be carried out based on both the AC component and the DC component of a load torque applied to a motor, so that the two-legged walking robot can cope with various shocks received, without any expectation while autonomously performing.

According to the load absorbing apparatus of the second to fourth aspects of this invention, in a case where overload is applied to the single axis of a motor, the AC component and the DC component of the load are properly absorbed, which can avoid breakage of the motor and members such as a link connected to the output shaft of the motor, and thereby preventing spreading of damage to other members.

As a result, this invention can provide an advanced robot apparatus, and a load absorbing apparatus and method for motors used as actuators for joint motion of a multi-joint type robot.

Further, this invention can provide an advanced robot apparatus, and a load absorbing apparatus and method, which are capable of properly detecting overload which may break motors or deform the body, and reducing the overload in the motors.

Still further, this invention can provide an advanced robot apparatus, and a load absorbing apparatus and method, which are capable of appropriately preventing breakage of members and the body due to overload applied to motors having a single or multiple axes in a multi-joint type robot comprising a plurality of actuator motors.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Construction of Robot of this Embodiment

Figure 3:
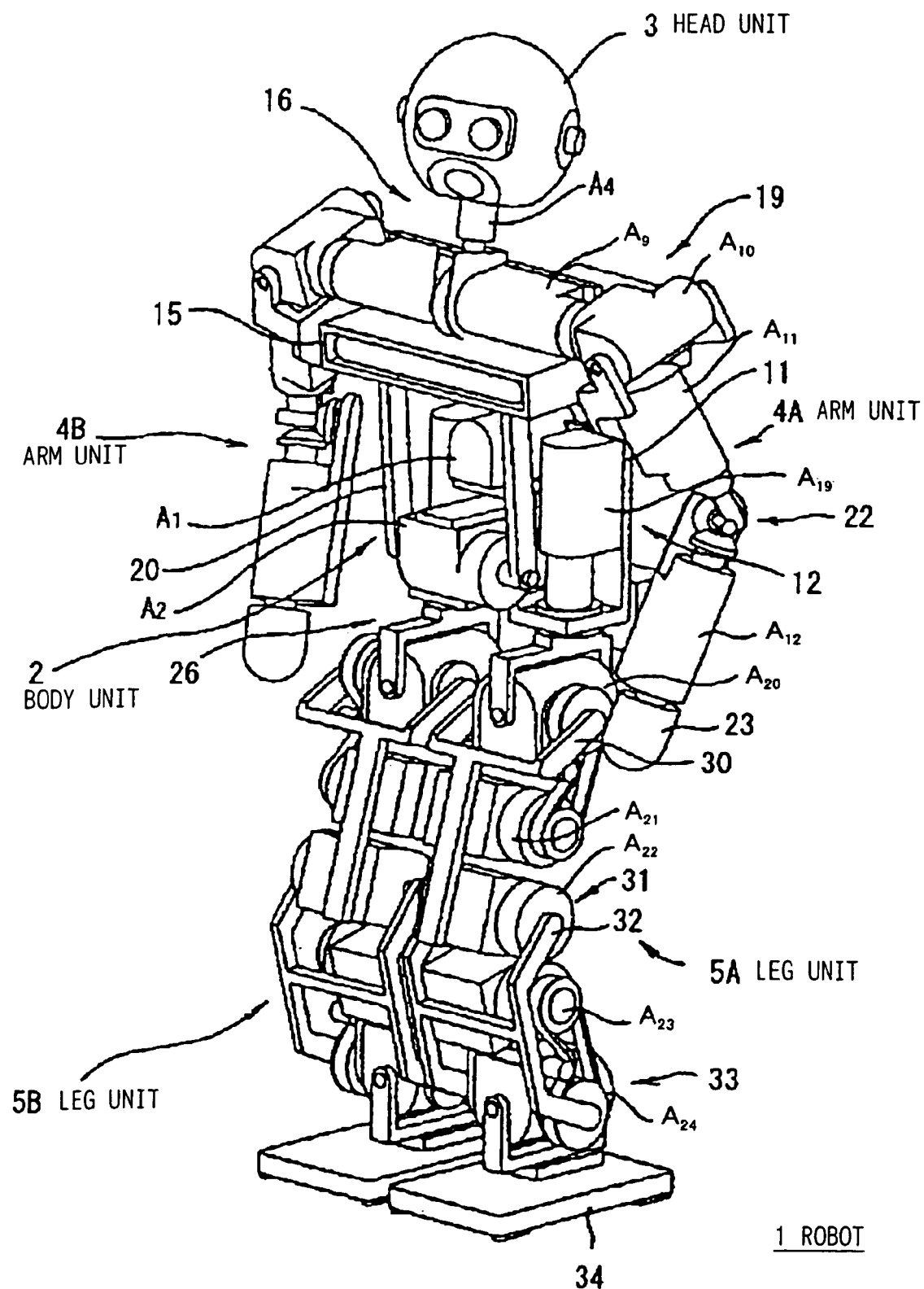
FIGS. 3 and 4 are perspective drawings showing an external construction of a robot 1 according to this embodiment.
Figure 4:
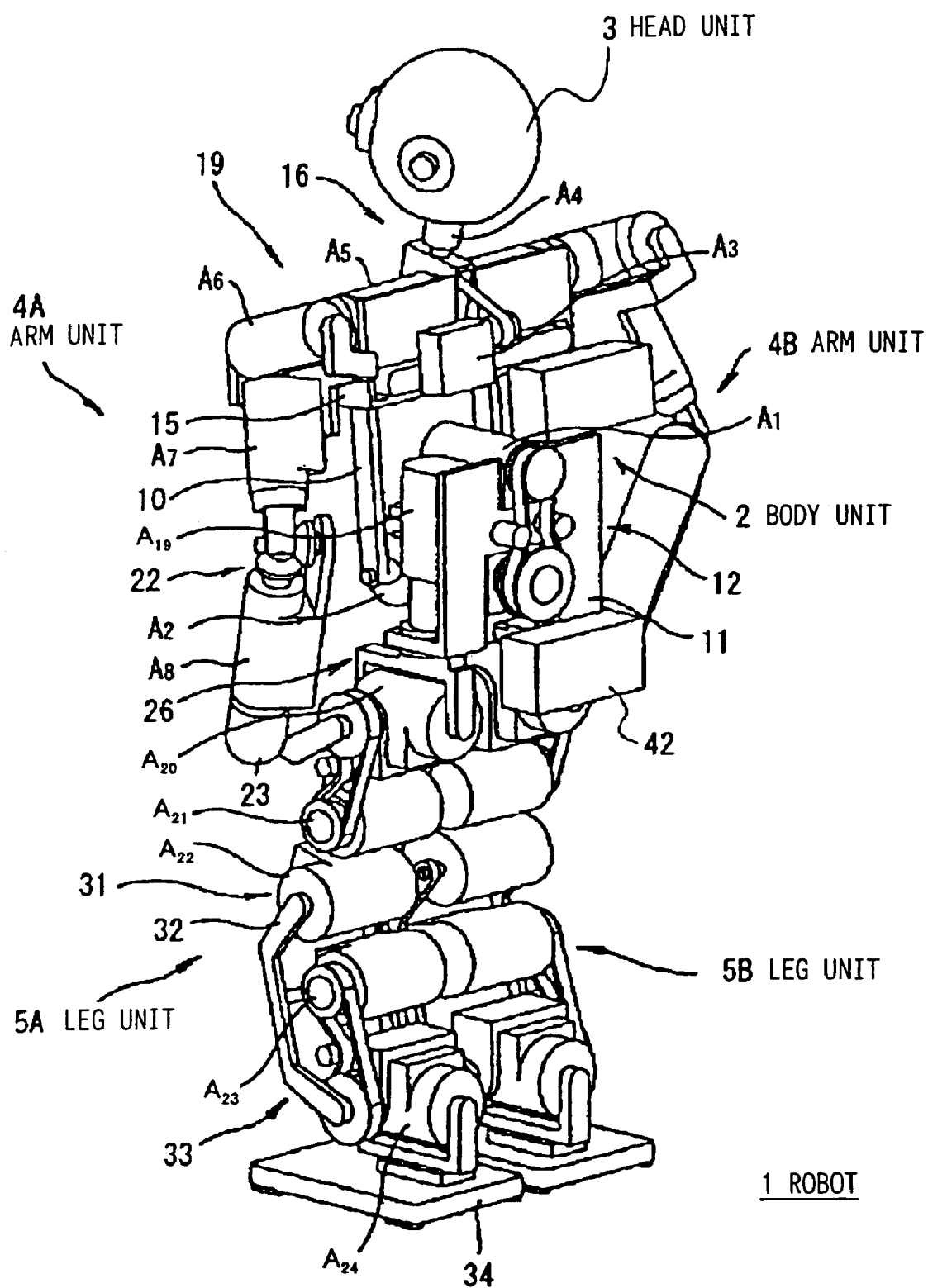
Figure 5:
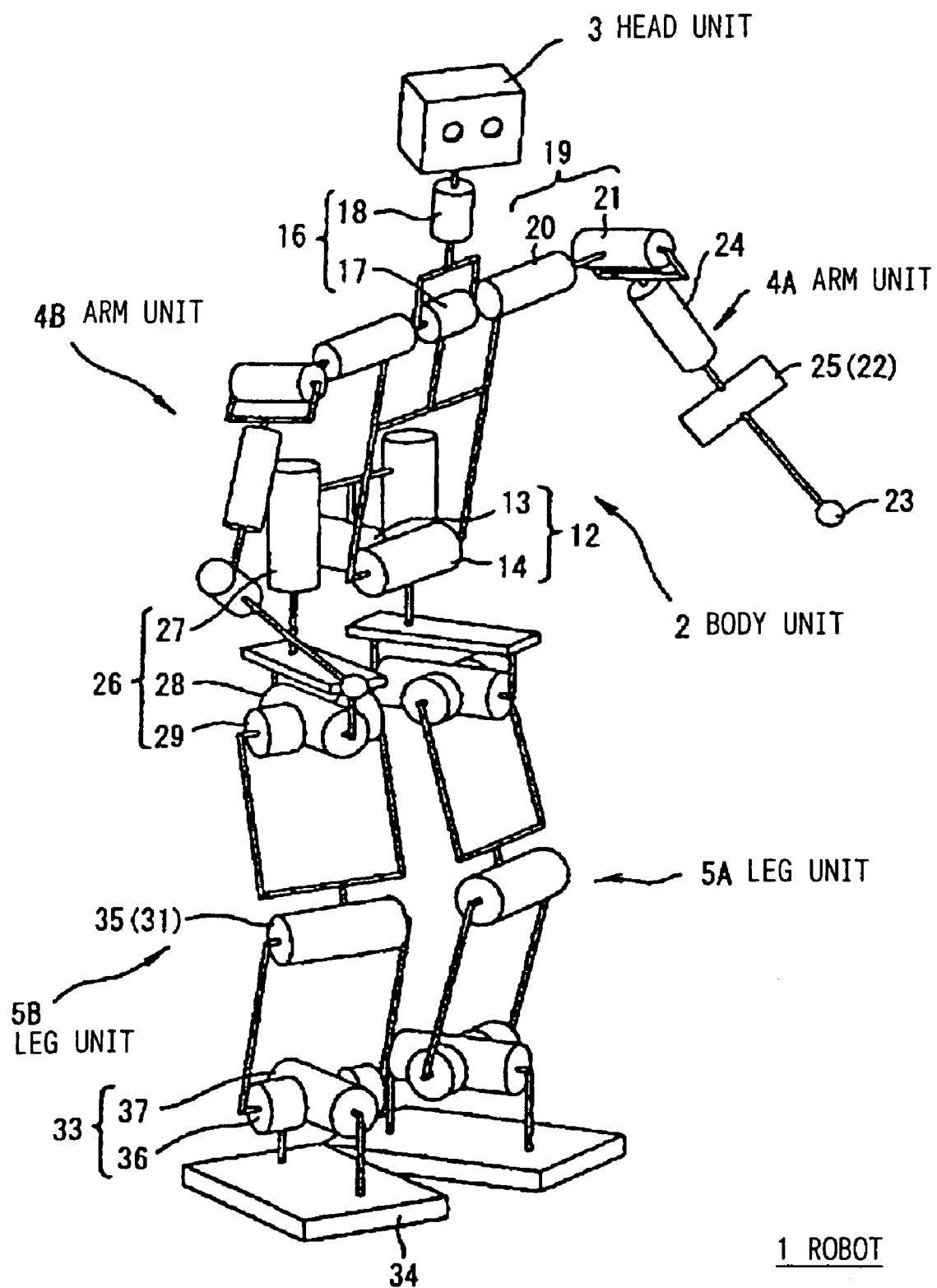
FIG. 5 is a schematic drawing explaining an external construction of the robot 1.

FIG. 3 and FIG. 4 show an entire construction of a two-legged walking robot according to one embodiment of the present invention. In addition, FIG. 5 schematically shows a structure of a degree of freedom in the robot. Reference numeral 1 shows a two-leg walking type robot as a whole, in which a head unit 3 is placed on a body unit 2, arm units 4A, 4B having the same construction are provided at upper left and right parts of the body unit 2, respectively, and leg units 5A, 5B having the same construction are provided at lower left and right parts of the body unit 2, respectively.

The body unit 2 is constructed of an upper body frame 10 and a waist base 11 forming a lower body both of which are connected to each other via a waist joint mechanism 12. By driving each of actuators $A_1$, $A_2$ of the waist joint mechanism 12 fixed to the waist base 11, the upper body can be rotated independently around a roll axis 13 and a pitch axis 14 which are orthogonal to each other as shown in FIG. 5.

Further, the head unit 3 is fixed on the center upper part of a shoulder base 15 fixed on the upper end of the frame 10 via a neck joint mechanism 16. By driving each of actuators $A_3$, $A_4$ of the neck joint mechanism 16, the head unit 3 can be rotated independently around a pitch axis 17 and a yaw axis 18 which are orthogonal to one another as shown in FIG. 5.

Furthermore, the arm units 4A, 4B are fixed to the left and right of the shoulder base 15, respectively, via a shoulder joint mechanism 19. By driving actuators $A_5$, $A_6$, $A_9$, $A_{10}$ of the shoulder joint mechanism 19, the arm units 4A, 4B can be rotated independently around a pitch axis 20 and a roll axis 21 which are orthogonal to one another as shown in FIG. 5.

In this case, as to the arm units 4A, 4B, actuators $A_8$ and $A_{12}$ forming forearms are connected to the output shafts of actuators $A_7$ and $A_{11}$ forming upper arms, respectively, via elbow joint mechanisms 22, and a hand unit 23 is attached to the distal end of each forearm. The forearms can be rotated around a yaw axis 24 shown in FIG. 5 by driving the actuators $A_7$ and $A_{11}$. In addition, the forearms can be rotated around a pitch axis 25 shown in FIG. 5 by driving the actuators $A_8$ and $A_{12}$.

On the other hand, each leg unit 5A, 5B is attached to the waist base 11 via a hip joint mechanism 26. By driving actuators $A_{13}$–$A_{18}$ and $A_{19}$ to $A_{24}$ of the hip joint mechanism 26, the leg units 5A, 5B can be rotated independently around a yaw axis 27, a roll axis 28, and a pitch axis 29 which are orthogonal to one another as shown in FIG. 5.

In this example shown, a lower-leg frame 32 is connected to the low end of a thigh frame 30 via a knee joint mechanism 31, and a foot unit 34 is connected to the low end of the frame 32 via an ankle joint mechanism 33. In each leg unit 5A, 5B, the lower leg can be rotated around a pitch axis 35 shown in FIG. 5 by driving an actuator $A_{16}$ or $A_{22}$ of the knee joint mechanism 31. In addition, the foot unit 34 can be rotated independently around a pitch axis 36 and a roll axis 37 which are orthogonal to each other as shown in FIG. 5, by driving actuators $A_{17}$, $A_{18}$, or $A_{23}$, $A_{24}$ of the ankle joint mechanism 33.

Figure 6:
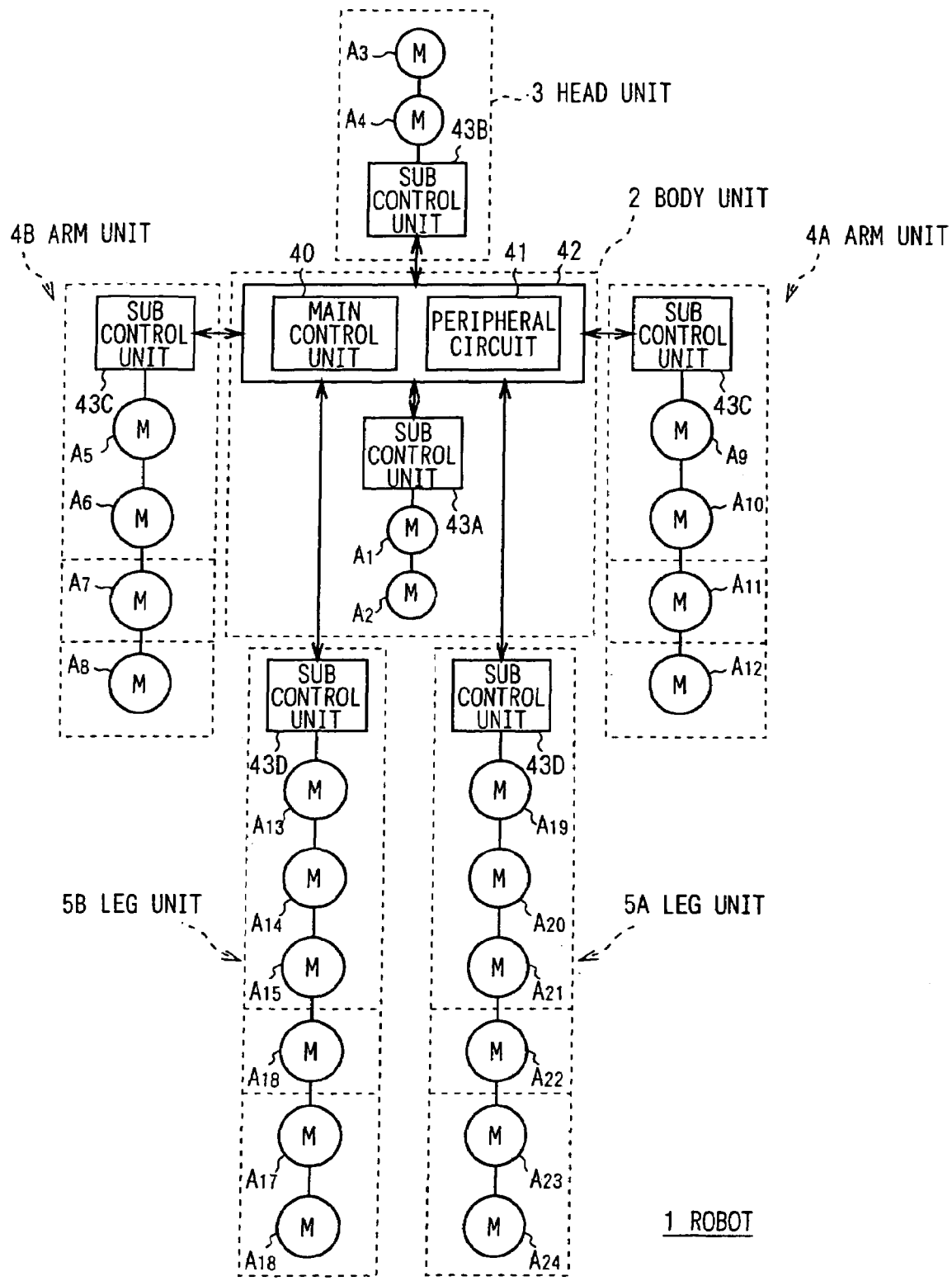
FIGS. 6 and 7 are block diagrams explaining an internal construction of the robot 1.

FIG. 6 schematically shows a control structure of the two-legged walking robot 1 according to this embodiment. On the back of the waist base 11, is arranged a control unit 42 housing a main control unit 40 for controlling the entire operation of the robot 1, peripheral circuitry 41 including a power circuit and a communication circuit, a battery 45, etc.

Figure 7:
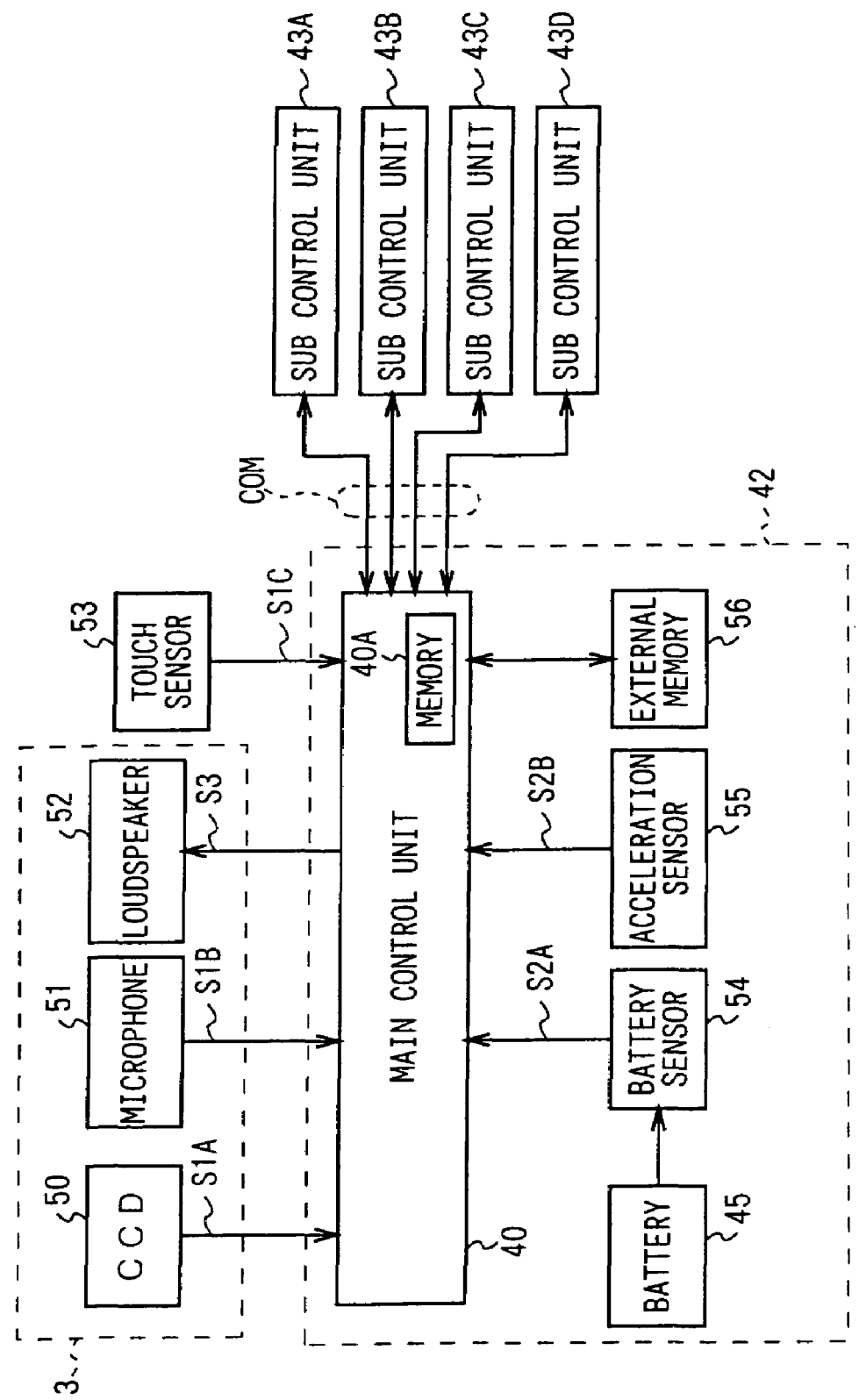

FIG. 7 schematically shows an internal structure of the control unit 42. This control unit 42 is connected to sub-control units 43A–43D arranged in respective constituent units (body unit 2, head unit 3, arm units 4A, 4B, and leg units 5A, 5B), so as to supply necessary power voltages to the sub-control units 43A to 43D and to communicate data with the units 43A to 43D.

Connected to the actuators $A_1$–$A_{24}$ of the corresponding constituent units, each sub-control unit 43A–43D is designed to be able to drive corresponding actuators $A_1$–$A_{24}$ in a manner specified by various commands given from the main control unit 40.

Furthermore, as shown in FIG. 7, at predetermined positions on the head unit 3 are arranged various external sensors such as a Charge Coupled Device (CCD) camera 50 functioning as "eyes" of the robot 1 and a microphone 51 as "ears", and an output unit such as a loudspeaker 52 as a "mouth". On each of the palms of the hand units 23 and the soles of the foot units 34 is arranged a touch sensor 53 as an external sensor. In addition, inside the control unit 42 is arranged various internal sensors including a battery sensor 54 and an acceleration sensor 55.

The CCD camera 50 captures surrounding environment and sends a captured video signal S1A to the main control unit 40. The microphone 51 collects external sounds and sends an obtained audio signal S1B to the main control unit 40. In addition, the touch sensor 53 detects physical pressures from a user and physical contacts with the outside, and sends a detected result to the main control unit 40 as a pressure signal S1C. Furthermore, the battery sensor 54 periodically detects an energy level of the battery 45 serving as the main power source, and sends the detected result to the main control unit 40 as a battery level signal S2A. The acceleration sensor 56 periodically detects acceleration in three axes (x axis, y axis, and z axis), and sends the detected results to the main control unit 40 as an acceleration signal S2B.

The main control unit 40 detects surrounding and internal conditions of the robot 1, contacts with an external entity, etc. based on the video signal S1A, the audio signal S1B, the pressure signal S1C, etc., being external sensor's outputs, and the battery level signal S2A, the acceleration signal S2B, etc. being internal sensor's outputs.

Then the main control unit 40 determines a subsequent action based on the detected results, a control program being stored in an internal memory 40A, and various control parameters being stored in an external memory 56 being installed, and sends control commands based on the determined results to relevant sub-control units 43A–43D. As a result, the specified actuators $A_1$–$A_{24}$ are set in motion based on the control commands and under the control of the sub-control units 43A–43D, thus letting the robot 1 take action, such as moving the head unit 3 up and down, left to right, raising the arm units 4A, 4B, and walking.

In addition, the main control unit 40 recognizes user's conversation through an audio recognition process based on the audio signal S1B, gives the loudspeaker 52 an audio signal S3 for response, resulting in output of synthesized sounds for communication with the user.

As described above, the robot 1 is capable of behaving autonomously based on surrounding and internal conditions, and also capable of communicating with the user.

Figure 8:
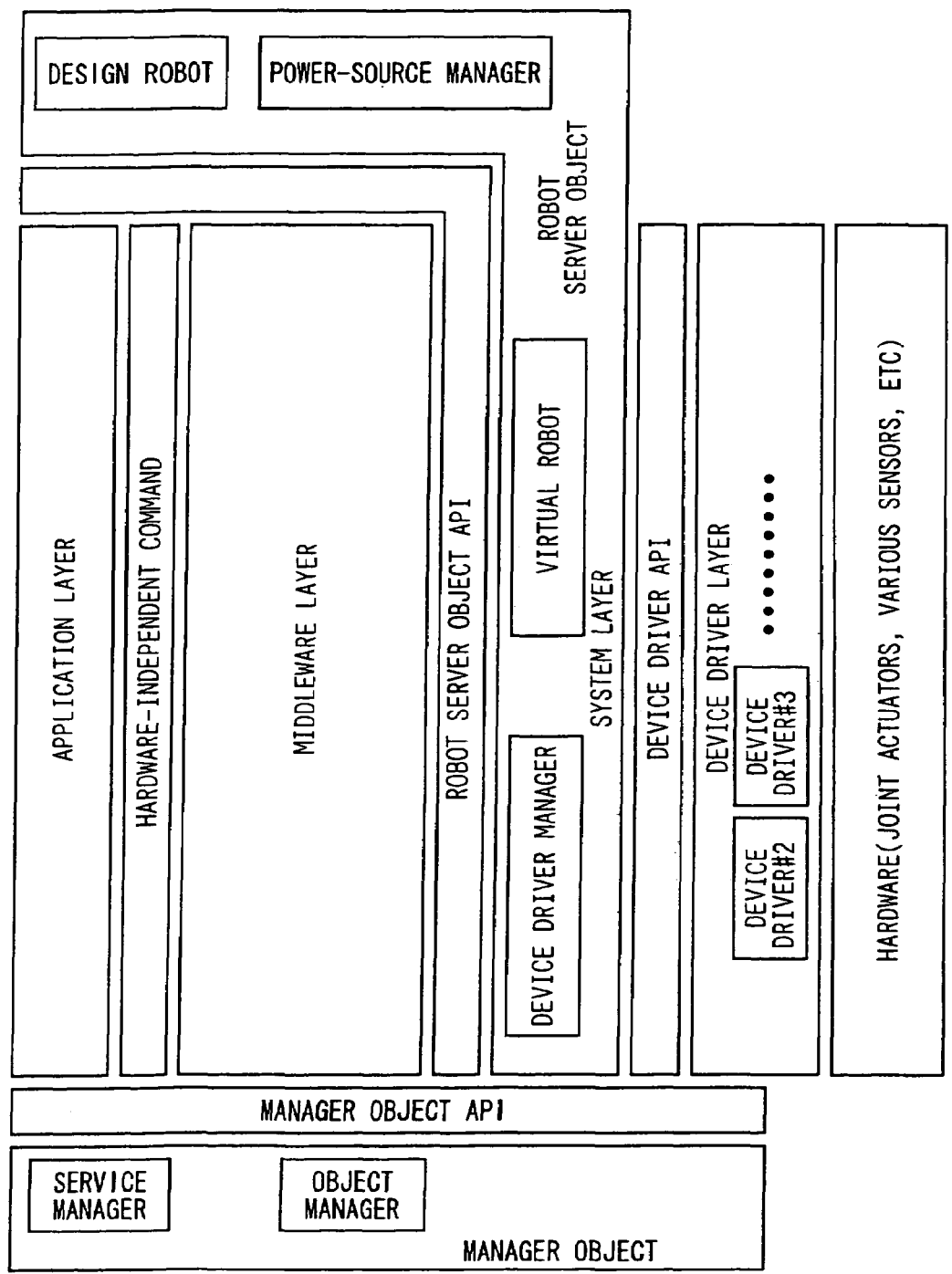
FIG. 8 is a schematic view showing a structure of software control performed in the robot 1.

FIG. 8 schematically shows a structure of control software operated on a two-legged walking robot 1 according to this embodiment.

As shown in this figure, the robot control software is multilayer software in which an object-oriented programming is adopted. Each software comprises modules called "objects" integrating data and processing of the data.

A device driver of the lowest layer comprises objects which are allowed to directly access hardware for driving of joint actuators, reception of sensor outputs and so on, and performs a suitable process in response to an interrupt request from the hardware.

A virtual robot is an object which mediates between various device drivers and an object operating based on inter-object communication protocol. Each of hardware units composing the leg-type walking robot 1 is accessed via this virtual robot.

A service manager is a system object which induces each object to make a connection, based on information on connection between the objects stored in a connection file.

Since each software having a higher ranking than a system layer (OS) comprises modules each representing an object (process), the objects are selectable and replaceable according to necessary functions. By rewriting the connection file, the inputs and outputs of objects having the same data structure are connected as desired.

Software modules other than the device driver layer and the system layer are broadly classified into a middleware layer and an application layer.

Figure 9:
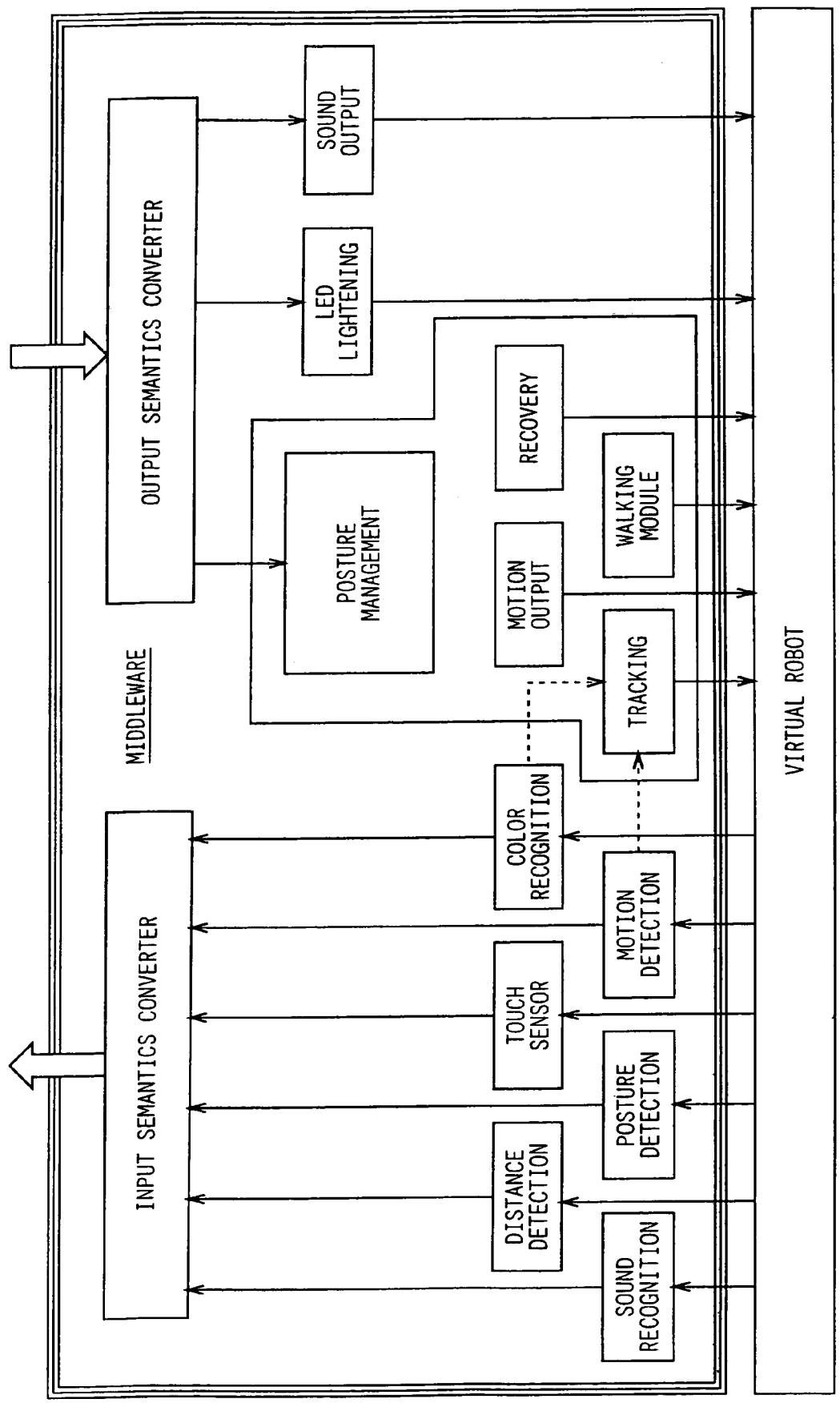
FIG. 9 is a schematic view showing an internal structure of a middleware layer.

FIG. 9 schematically shows an internal structure of the middleware layer.

The middleware layer is a collection of software modules to provide basic functions of the two-legged walking robot 1, the structure of each module is affected by hardware attribution such as mechanical and electrical features, specifications, and shapes of the two-legged walking robot 1. This middleware layer is functionally divided into a recognition middleware (the left half in FIG. 9) and an output middleware (the right half in FIG. 9).

The recognition middleware receives and processes raw data from the hardware via the virtual robot, the raw data including video data, audio data and other data obtained from other sensors. For example, this middleware performs various processes such as audio recognition, distance detection, posture detection, contact detection, motion detection, and color recognition, based various input information, to recognize the robot's situation (for example, "detected a ball", "fell down", "being pat", "being hit", "heard musical scales", or "detected a moving entity or an obstacle"). This recognized situation is notified to the higher-ranked application layer via an input semantics converter to be used for a subsequent action plan or learning.

The output middleware, on the other hand, realizes functions for walking, moving, output of synchronized sounds, blinking control of the LEDs functioning as eyes. That is, the output middleware receives the action plan made by the application layer via an output semantics converter, and creates a servo command value for each joint of the two-legged walking robot 1, and sounds and light (LEDs) to be output, in order to let the robot 1 perform based on the plan via the virtual robot. In addition, this output middleware of this embodiment includes a load monitoring module for detecting whether load in a plurality of actuator motors are totally excessive and a module for executing a body protection operation when an overload state is detected (this will be described later).

Figure 10:
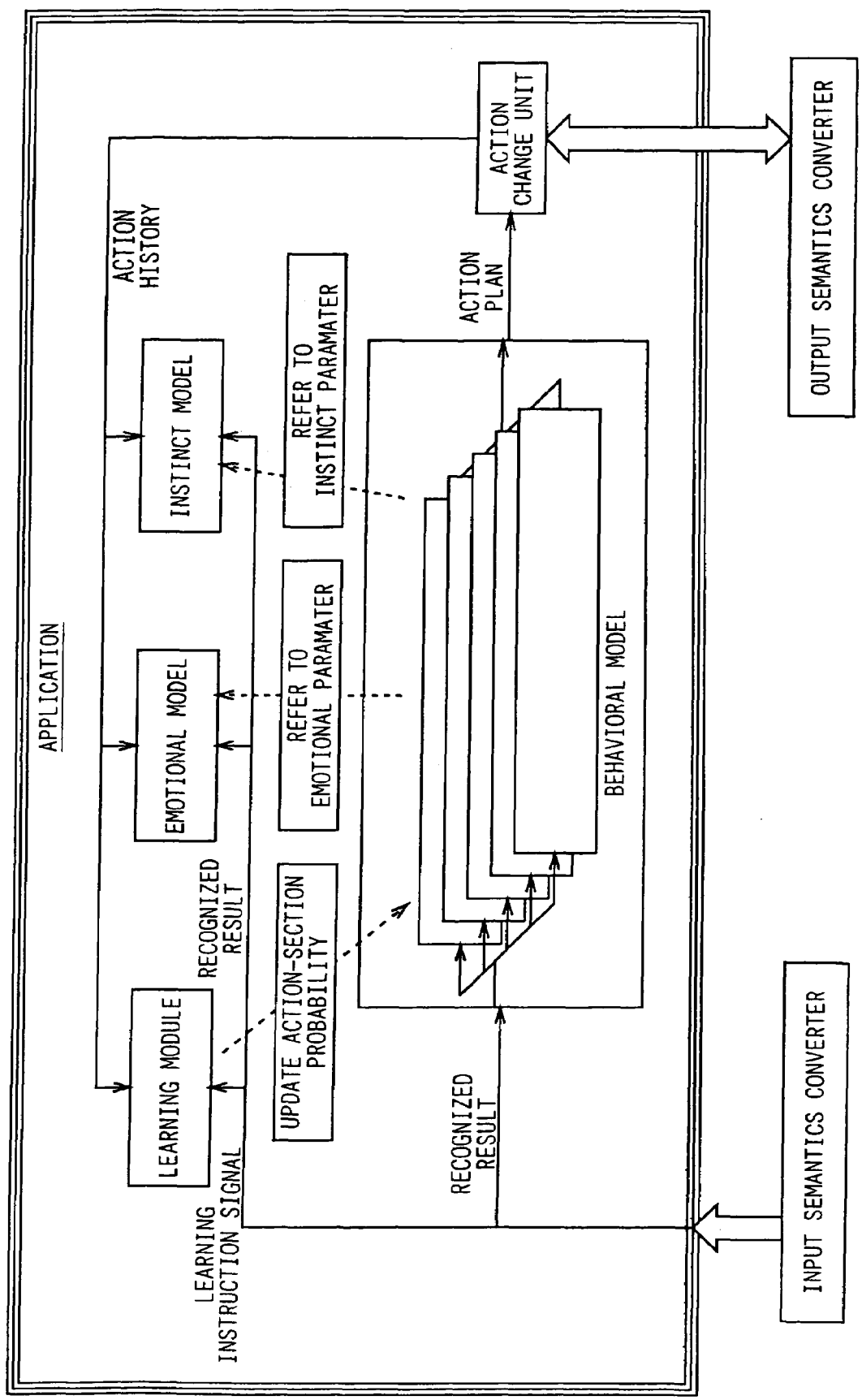
FIG. 10 is a schematic view showing an internal structure of an application layer.

FIG. 10 schematically shows an internal structure of the application layer. This application layer is composed of one or more application softwares for controlling robot's performance and internal conditions such as instinct and emotions.

This application uses the recognized situation received via the input semantics converter to determine the action plan of the lag-type moving robot 1, and notifies the determined plan via the output semantics converter.

The application is composed of an emotional model, an instinct model, a learning module for sequentially storing experienced events, a behavioral model storing behavior patterns, and an action changing unit for moving the robot 1 based on the action plan determined by the behavioral model.

The recognized situation input via the input semantics converter is input to the emotional model, the instinct model, and the behavioral model, and also to the learning module as a learning instruction signal.

The action plan for the two-legged walking robot 1 determined by the behavioral model is sent to the middleware via the action changing unit and the output semantics converter, so that the robot 1 takes the action. This action plan is also given to the emotional model, the instinct model and the learning module via the action changing unit as an action history.

Based on the recognized situation and the action history, the emotional model and the instinct model control the emotional parameter and instinct parameter, respectively. The behavioral model can refer to these parameters. In addition, the learning module updates an action-selection probability based on the learning instruction signal, and supplies the updated contents to the behavioral model.

(2) Construction of Actuators $A_1$ to $A_{24}$

As described above, a degree of freedom in each joint of the two-legged walking robot 1 according to this embodiment is realized by the actuators $A_1$ to $A_{24}$.

Figure 11:
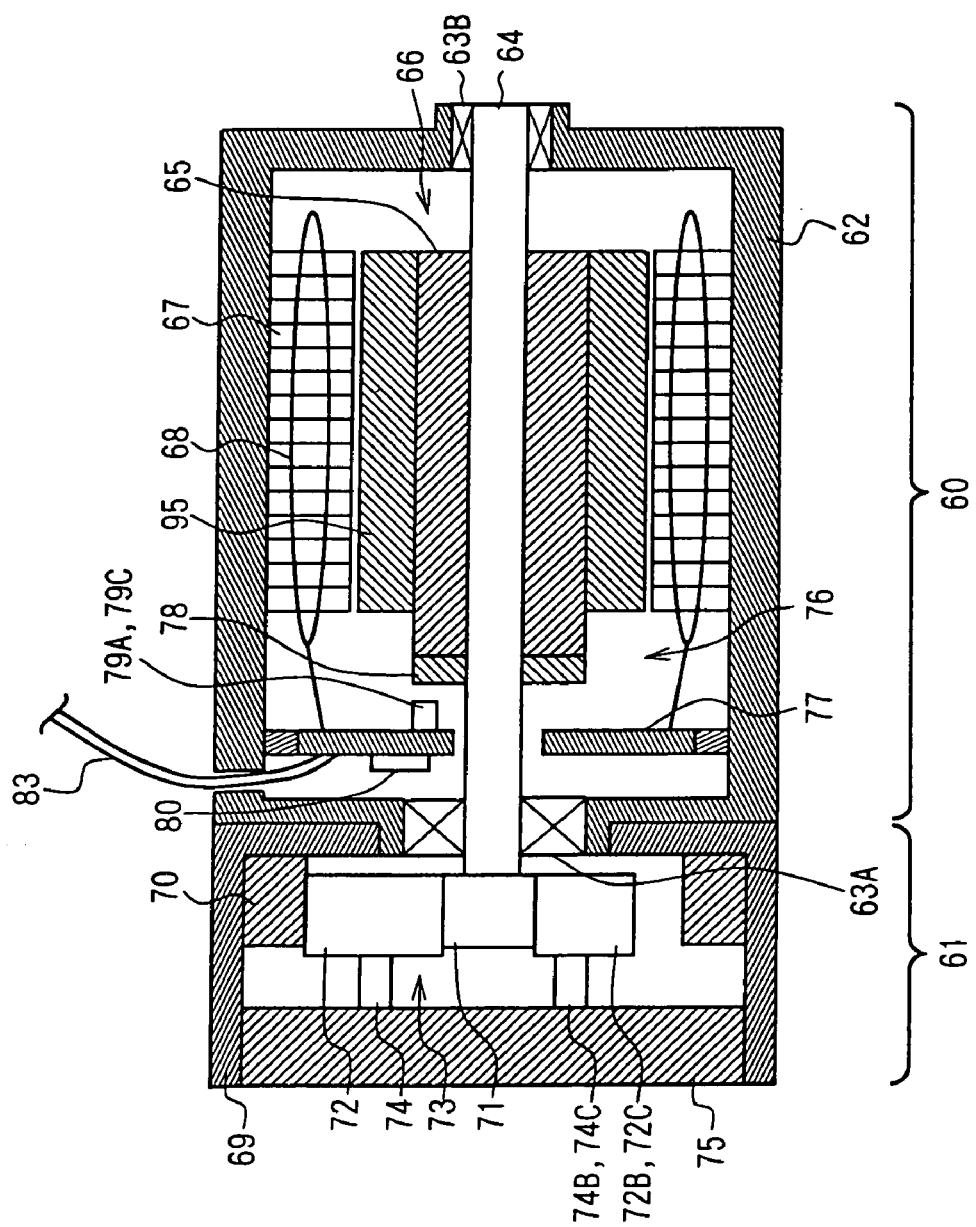
FIG. 11 is a schematic view showing an internal structure of an actuator $A_1$ to $A_{24}$.

FIG. 11 shows the internal construction of each actuator $A_1$ to $A_{24}$. As shown in this figure, each actuator $A_1$ to $A_{24}$ is composed of a motor unit 60 for generating a rotational torque and a torque amplification unit 61 for amplifying and outputting the rotational torque.

Figure 12C:
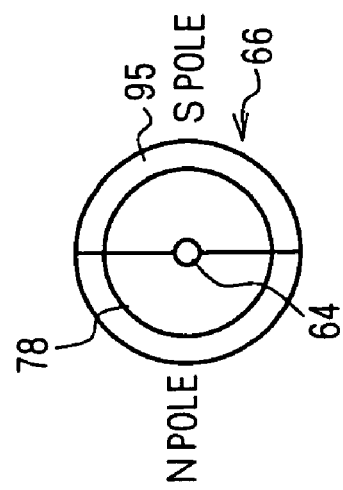
FIGS. 12A to 12C are drawings showing the constructions of a rotor shaft 64 and a rotor-shaft magnetic-pole angle sensor.
Figure 12B:
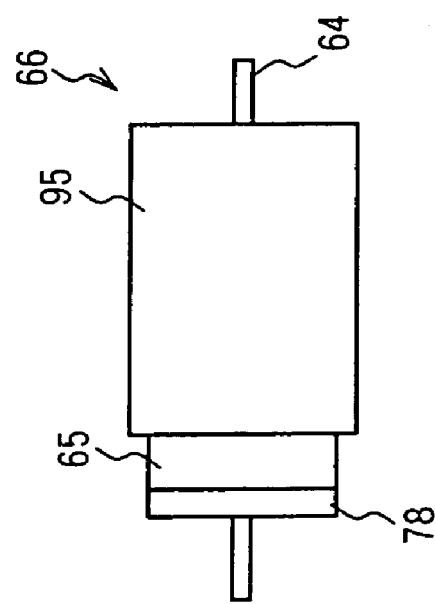
Figure 12A:
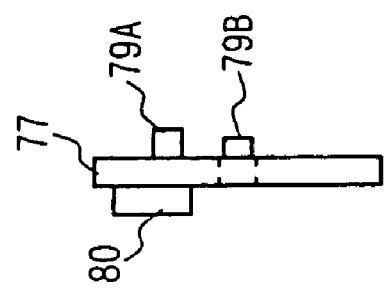

In the motor unit 60, a rotor shaft 64 rotatably supported by bearings 63A, 63B is provided inside a motor case 62 made of conducting material such as metal. FIGS. 12A to 12C show the constructions of the rotor shaft 64 and a rotor-shaft magnetic-pole angle sensor. As shown in FIG. 12A and 12B, a rotor 66 is formed in such a manner that a rotor base 65 and a rotor magnet 95 which is a double pole ring permanent magnet are integrated coaxially with the rotor shaft 64.

Figure 13:
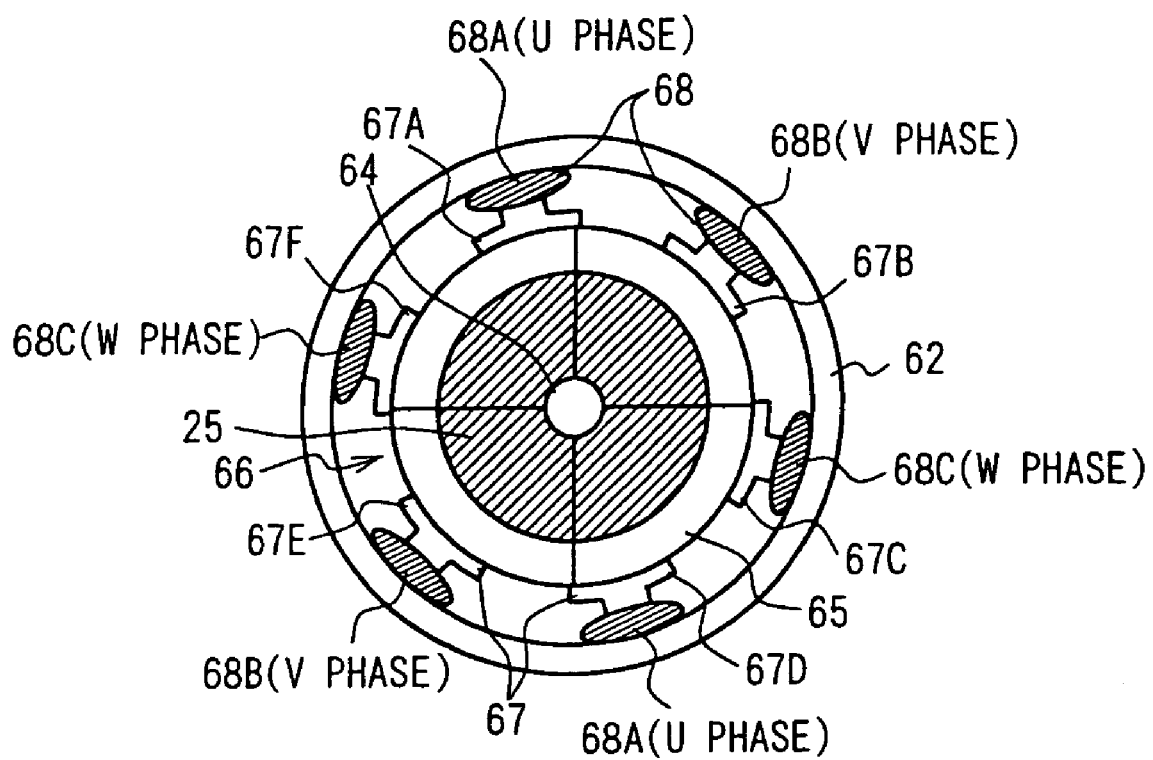
FIG. 13 is a drawing showing a positional relationship among a rotor 66 and stator cores 67A to 67F.

FIG. 13 shows a relationship among the rotor 66 and stator cores 67A to 67F. As shown in this figure, inside the motor case 62, six stator cores 67A to 67F are fixed every 60 degrees around the rotor 66. Three phase coils 68 (68A, 68B, 68C) are formed by winding a wire on the stator cores 67 (67A to 67F).

As shown in FIG. 13, three pairs of two opposite coils 63 are U-, V-, W-phase. By applying coil currents having 120-deegree phase difference to the U-, V-, W-phase coils 68, each coil 68 generates a magnetic field corresponding to the drive current, so that the rotor 66 can generate a rotational torque corresponding to the coil current.

Figure 14C:
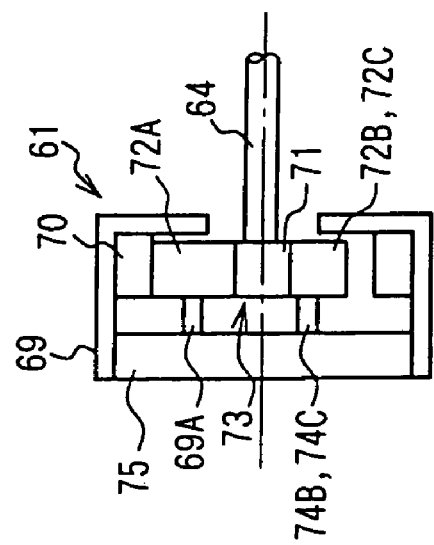
FIGS. 14A to 14C are drawings showing the construction of a torque amplification unit 61.
Figure 14B:
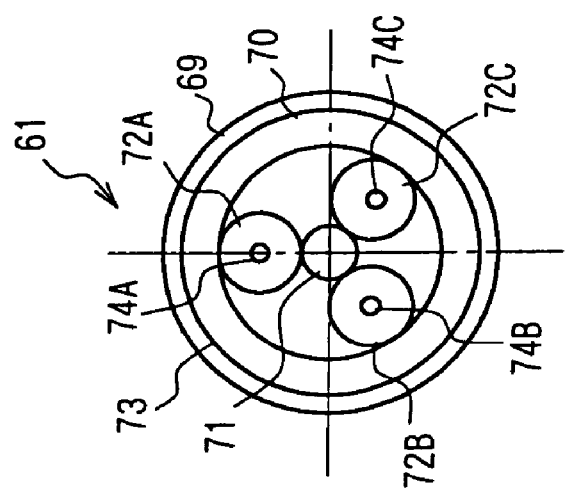
Figure 14A:
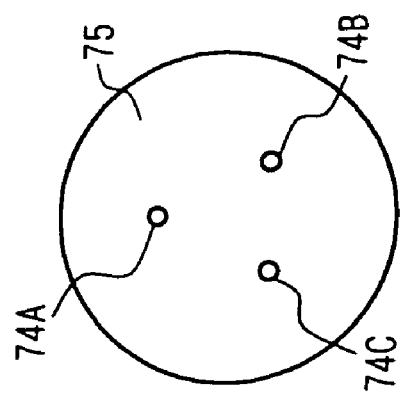

FIGS. 14A to 14C show the construction of the torque amplification unit 61. As apparent from FIG. 11, the torque amplification unit 61 has a gear case 69 detachably fixed to one end of the motor case 62. Inside this gear case 69, a planetary gear mechanism 73 is provided, the planetary gear mechanism 73 having a ring internal gear 70 attached to the inside of the gear case 69, a sun gear 71 fixed to an end of the rotor shaft 64, and first to third planetary gears 72A to 72C arranged every 120 degrees between the internal gear 70 and the sun gear 71.

In addition, each shaft 74A to 74C of the first to third planetary gears 72A to 72C are fixed to the output shaft 75 rotatably arranged at an end of the gear case 69. Therefore, the torque amplification unit 61 can amplify a rotational torque given from the motor unit 60 via the rotor shaft 64, via the planetary gear mechanism 73 and then output the resultant to the outside via the output shaft 75.

In addition, the motor case 62 of the motor unit 60 contains an encoder 76 for detecting rotations of the rotor shaft 64 and a control substrate 77 for controlling a rotation angle and a rotational torque of the rotor shaft 64 in response to an operation command from a higher-ranked controller (corresponding sub-control unit 43A to 43D) (see FIG. 11).

Figure 15A:
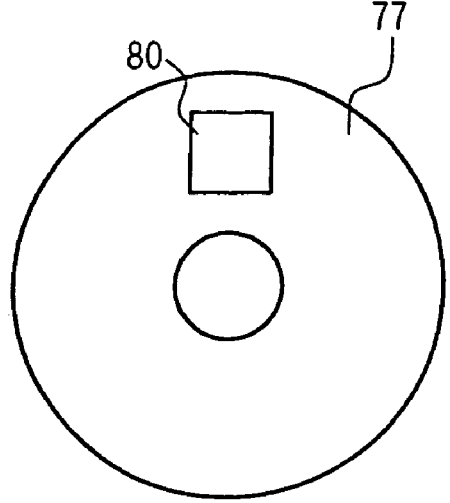
FIGS. 15A, 15B and 16 are drawings showing the construction of a control substrate 77.
Figure 15B:
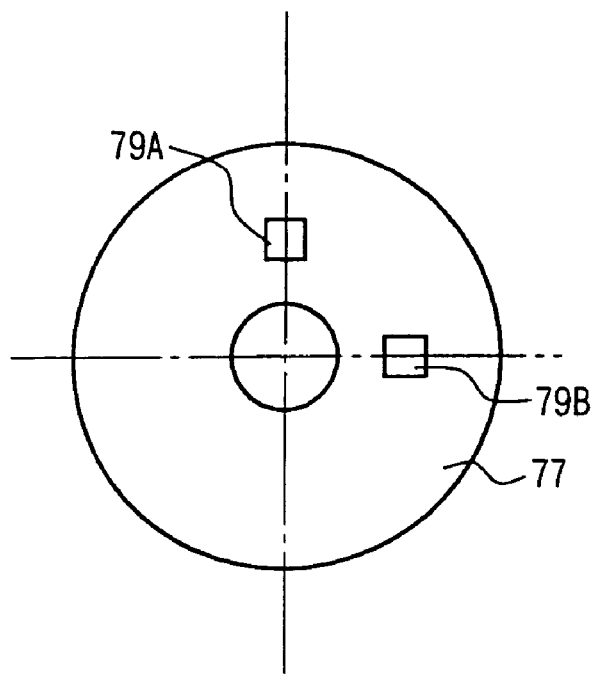

In this case, the encoder 76 is composed of the double-pole resin magnet 78 and first and second hole elements 79A, 79B (see FIGS. 12A to 12C). FIGS. 15A and 15B show the construction of the control substrate 77. As shown in FIG. 15B, the first and second hole elements 79A, 79B are arranged coaxially with the rotor shaft 64 at 90 degree phase difference on the control substrate 77.

Therefore, the encoder 76 is capable of detecting the rotational position of the rotor shaft 64 as the change of magnetic flux density at the first and second hole elements 79A, 79B, the change going with the rotation of the resin magnet 78 which rotates together with the rotor shaft 64.

Figure 16:
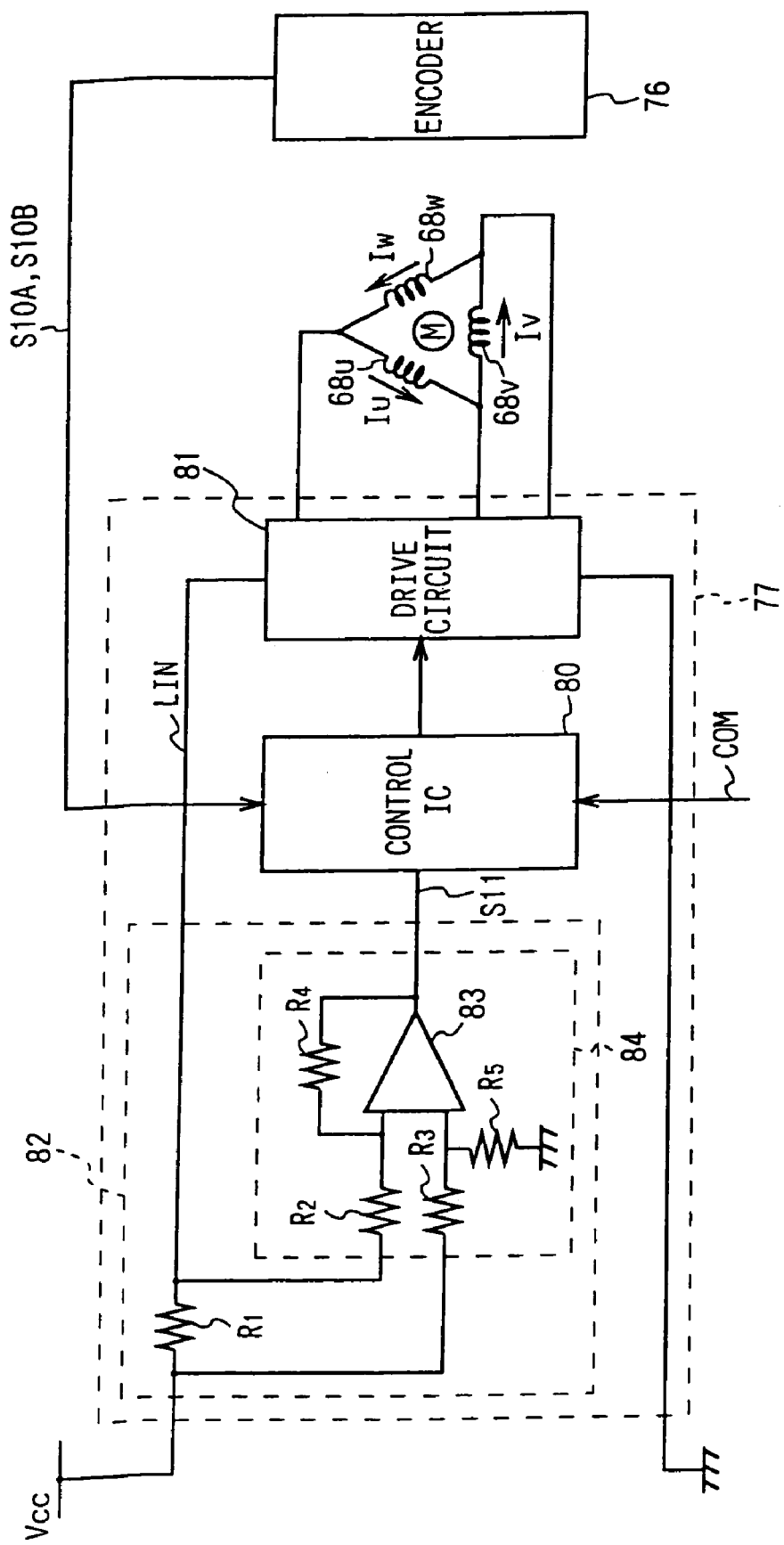

Further, as shown in FIG. 16, in the control substrate 77, a control IC 80 and a drive circuit 81 for supplying drive currents Iu, Iv, Iw to the coils 68$u$, 68$v$, 68$w$ of the motor unit 60 under the control of the control IC 80 are arranged on a circular printed wiring board. The control IC 80 is capable of receiving the outputs of the first and second hole elements 79A, 79B as first and second position signals S10A, S10B, respectively, and thereby detecting the rotational position of the rotor shaft 64 based on the signals.

The control substrate 77 is connected to a higher-ranked controller (corresponding sub control unit) via a cable 83 (see FIG. 11), so that the control IC 80 can communicate with the higher-ranked controller via the cable 83 and be supplied with power voltage Vcc.

Then, the control IC 80 controls the drive circuit 81 based on the operation command COM given from the higher-ranked controller via the cable 83 and the first and second position signals S10A, S10B, to apply the drive currents Iu, Iv, Iw to corresponding U-, V-, and W-phase coils 68 of the motor unit 60, so that the motor unit 60 can rotate by a rotation angle or generate a rotational torque depending on the operation command COM.

(3) Constructions of Control IC 80 and Drive Circuit 81

Figure 17:
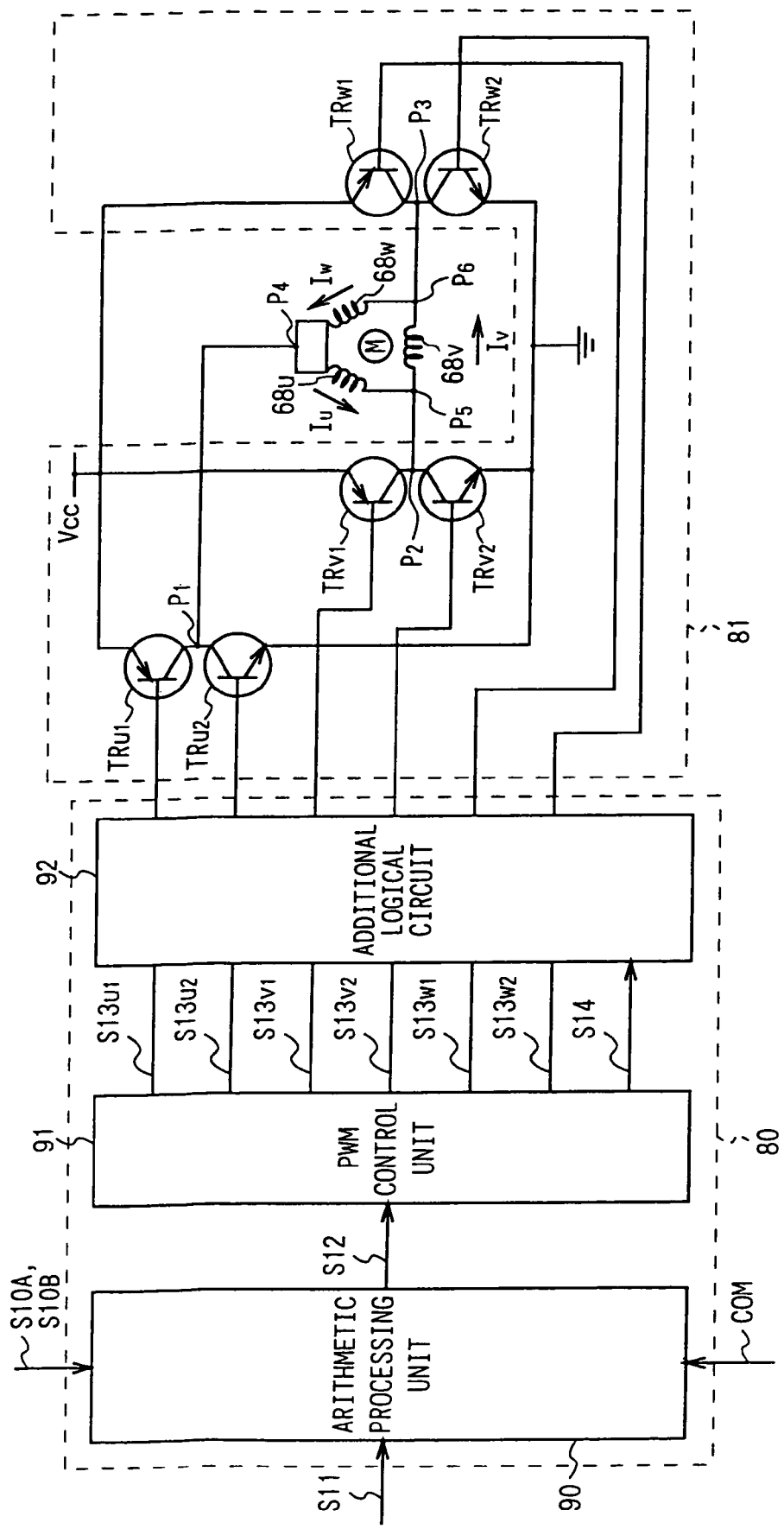
FIG. 17 is a drawing showing the constructions of a control IC 80 and a driving circuit 81.

FIG. 17 shows the constructions of the control IC 80 and the drive circuit 81. As shown in this figure, the control IC 80 is composed of an arithmetic processing unit 90, a PWM control unit 91, and an additional logical circuit 92.

The arithmetic processing unit 90 is constructed like a microcomputer including a CPU, ROM and RAM, and this unit 90 obtains a difference between a targeted rotational position of the rotor shaft 64 of the motor unit 60 based on the operation command COM from the higher-ranked controller and the current rotational position of the rotor shaft 64 obtained based on the first and second position signals S10A, S10B given from the encoder 76, and also calculates a targeted output torque (hereinafter, referred to as a targeted torque) in order to eliminate the difference, and sends the calculation result to the PWM control unit 91 as a torque command signal S12.

The PWM control unit 91 PWM-controls the drive circuit 81 via the additional logical circuit 92 based on the torque command signal S12 so that the motor unit 60 can generate the targeted torque as its output torque.

The drive circuit 81 is composed of a pair of PNP transistor TRu1 and NPN transistor TRu2 for U phase, a pair of PNP transistor TRv1 and NPN transistor TRv2 for V phase, and a pair of PNP transistor TRw1 and NPN transistor TRw2 for W phase.

Each emitter of the PNP transistors TRu1, TRv1, TRw1 is connected to the power voltage Vcc, the collectors of the PNP transistors TRu1, TRv1, TRw1 are connected to the collectors of the NPN transistors TRu2, TRv2, TRw2, respectively, and each emitter of the NPN transistors TRu1, TRv1, TRw1 is grounded. In addition, the connecting points P1 to P3 connecting the collectors of the PNP transistors TRu1, TRv1, TRw1 and the collectors of the corresponding NPN transistors TRu2, TRv2, TRw2 are connected to a connecting point P4 between the U-phase coil 68$u$ and the W-phase coil 68$w$, a connecting point P5 between the U-phase coil 68$u$ and the V-phase coil 68$v$, and a connecting point P6 between the V-phase coil 68$v$ and the W-phase coil 68$w$.

By turning ON the PNP transistor TRu1 and the NPN transistor TRv2 and turning OFF the NPN transistor TRu2 and the PNP transistor TRv1, the U-phase coil 68$u$ becomes conductive to flow the drive current IU in an arrow direction. In addition, by turning OFF the PNP transistors TRu1, TRv1 and the NPN transistors TRu2, TRv2, the terminals P4, P5 are put in an open state and the U-phase-coil 68$u$ becomes nonconductive.

Similarly, by turning ON the PNP transistors TRv1 and the NPN transistor TRw2 and turning OFF the NPN transistor TRv2 and the PNP transistor TRw1, the V-phase coil 68$v$ becomes conductive to flow the drive current IV in an arrow direction. In addition, by turning OFF the PNP transistors TRv1, TRw1 and the NPN transistors TRv2, TRw2, the terminals P5, P6 are put in an open state and the V-phase coil 68$v$ becomes nonconductive.

Further, similarly, by turning ON the PNP transistors TRw1 and the NPN transistor TRu2 and turning OFF the NPN transistor TRw2 and the PNP transistor TRu1 OFF, the W-phase coil 68$w$ becomes conductive to flow the drive current IW in an arrow direction. In addition, by turning OFF the PNP transistors TRw1, TRu1 and the NPN transistors TRw2, TRu2, the terminals P6, P4 are put in an open state and the w-phase coil 68$w$ becomes nonconductive.

As a result, the PWM control unit 91 gives first to sixth PWM signals S13$u$1, S13$u$2, S13$v$1, S13$v$2, S13$w$1, S13$w$2 corresponding to the targeted torque obtained based on the torque command signal S12, to the bases of the corresponding PNP transistors TRu1, TRv1, TRw1 and the NPN transistors TRu2, TRv2, TRw2, to thereby switch each of the U-, V-, and W-phase coils 68u, 68v, 68w between the conductive state and the nonconductive state, resulting in rotation of the motor unit 60.

Note that, in the case where the position of the motor unit 60 is controlled by the PWM control, putting the terminals P4, P5, P6 in the open state while the coils 68u, 68v, 68w are nonconductive arises problems in that a torque loss occurs because current existing in the motor unit 60 (strictly, charge) is easy to be lost and cogging torque is easy to affect the control.

Figure 18:
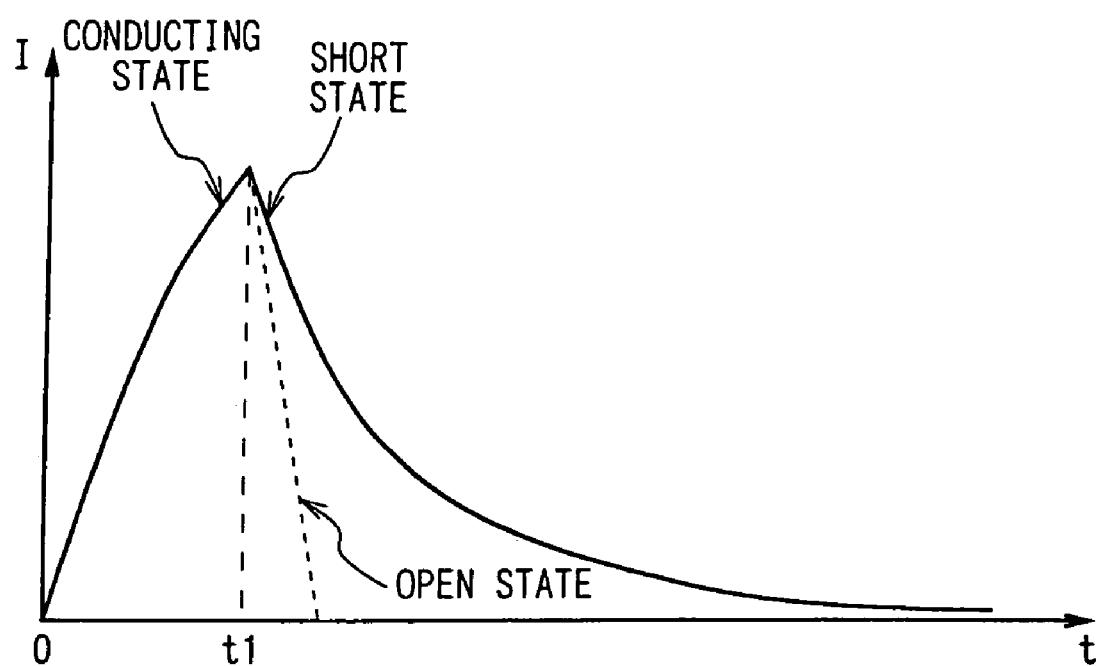
FIG. 18 is a view showing excess response characteristics of coil current in a case where the terminal ends of a coil are in an open state and in a short state.

However, this embodiment solves the torque loss problem by utilizing such a fact that currents (strictly charge) existing in the coils 68u, 68v, 68w do not decrease easily by putting the terminals P4, P5, P6 of the coils 68u, 68v, 68w in the short state, not in the open state, while the coils 68u, 68v, 68w are nonconductive. FIG. 18 shows the excessive response characteristics of coil current for cases where the ends of a coil are put in the open state and the short state. As clear from this figure, the short state requires a longer settling time, so that the coil current does not decrease easily.

This is because putting the terminals P4, P5, P6 in the short state causes a time delay in the excessive response which is resulted from DC resistance and inductance of the coils 68u, 68v, 68w of the motor unit 60. In addition, in the short state, a magnetic flux density from the rotor magnet 95 generates a reverse electromotive force to the coils 68u, 68v, 68w. This reverse electromotive force is applied in a reverse direction of rotation of the rotor 66 to generate a viscosity resistance against the rotation by an external force, which obtains an effect like a break. Such viscosity resistance generated by creating a viscosity coefficient against the motor unit 60 can reduce the effect of the cogging torque without torque loss.

However, putting the terminals P4, P5, P6 of the coils 68u, 68v, 68w in the short state means applying a kind of viscosity resistance to the motor unit 60, which arises another problem in that a break due to the short states of the terminals P4, P5, P6 of the coils 68u, 68v, 68w loses compliance in the motor unit 60.

In this embodiment, to solve the above torque loss problem and this compliance problem together, the terminals P4, P5, P6 of the coils 68u, 68v, 68w are alternatively switched between the open state and the short state while the coils 68u, 68v, 68w are nonconductive, and a ratio of a period for the open state to a period for the short state is adjusted so as to obtain desired compliance.

Figure 19:
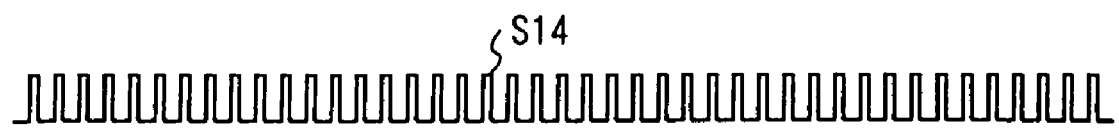
FIG. 19 is a view showing an example of a waveform of a BRAKE_PWM control signal.

Actually, as a means for alternatively switching the terminals P4, P5, P6 of the coils 68u, 68v, 68w between the open state and the short state, the additional logical circuit 92 is provided at a latter stage of the PWM control unit 91. The additional logical circuit 92 is given, for example, a BRAKE_PWM control signal S14 of a short waveform together with the first to sixth PWM signals S13u1, S13u2, S13v1, S13v2, S13w1, S13w2, from the PWM control unit 91, the signal S14 being subjected to PWM modulation according to a prescribed ratio of a period for the open state to a period for the short state regarding the terminal P4, P5, P6. FIG. 19 shows a waveform example of the BRAKE_PWM control signal.

The additional logical circuit 92 changes, according to necessity, the logical levels of the corresponding first to sixth PWM signals S13u1, S13u2, S13v1, S13v2, S13w1, S13w2 so as to put the terminals P4, P5, P6 of the coils 68u, 68v, 68w in the short state while the coils 68u, 68v, 68w are nonconductive and the BRAKE_PWM control signal S14 has a logical level "1".

Specifically, to put the terminals P4, P5 of the U-phase coil 68u in the open state while the coils are nonconductive, the PWM control unit 91 normally outputs the first to fourth PWM signals S13u1, S13u2, S13v1, S13v2 to turn OFF the PNP transistors TRu1, TRuv1 and the NPN transistors TRu2, TRv2. However, the additional logical circuit 92 intermittently puts the terminals P4, P5 in the short state by turning ON the PNP transistors TRu1, TRv1, which are currently off, while the BRAKE_PWM control signal S14 has a logical level "1".

Similarly, to put the terminals P5, P6 of the V-phase coil 68v in the open state while the coils are nonconductive, the PWM control unit 91 normally outputs the third to sixth PWM signals S13v1, S13v2, S13w1, S13w2 to turn OFF the PNP transistors TRv1, TRw1 and the NPN transistors TRv2, TRw2. However, the additional logical circuit 92 intermittently puts the terminals P5, P6 in the short state by turning ON the PNP transistors TRv1, TRw1, which are currently OFF, while the BRAKE_PWM control signal S14 has a logical level "1".

Further, similarly, to put the terminals P6, P4 of the W-phase coil 68w in the open state while the coils are nonconductive, the PWM control unit 91 normally outputs the first, second, fifth, and sixth PWM signals S13u1, S13u2, S13w1, S13w2 to turn OFF the PNP transistors TRw1, TRu1 and the NPN transistors TRw2, TRu2. However, the additional logical circuit 92 intermittently puts the terminal P6, P4 in a short state by turning ON the PNP transistors TRw1, TRu1, which are currently OFF, while the BRAKE_PWM control signal S14 has a logical level "1".

In a case where the BRAKE_PWM control signal S14 has a logical level "0" while the coils are nonconductive, on the other hand, the additional logical circuit 92 normally outputs the first to sixth PWM signals S13u1, S13u2, S13v1, S13v2, S13w1, S13w2 from the PWM control unit 91 as they are, resulting in leaving the terminals P4, P5, P6 of the coils 68u, 68v, 68w in the open state.

Figure 20:
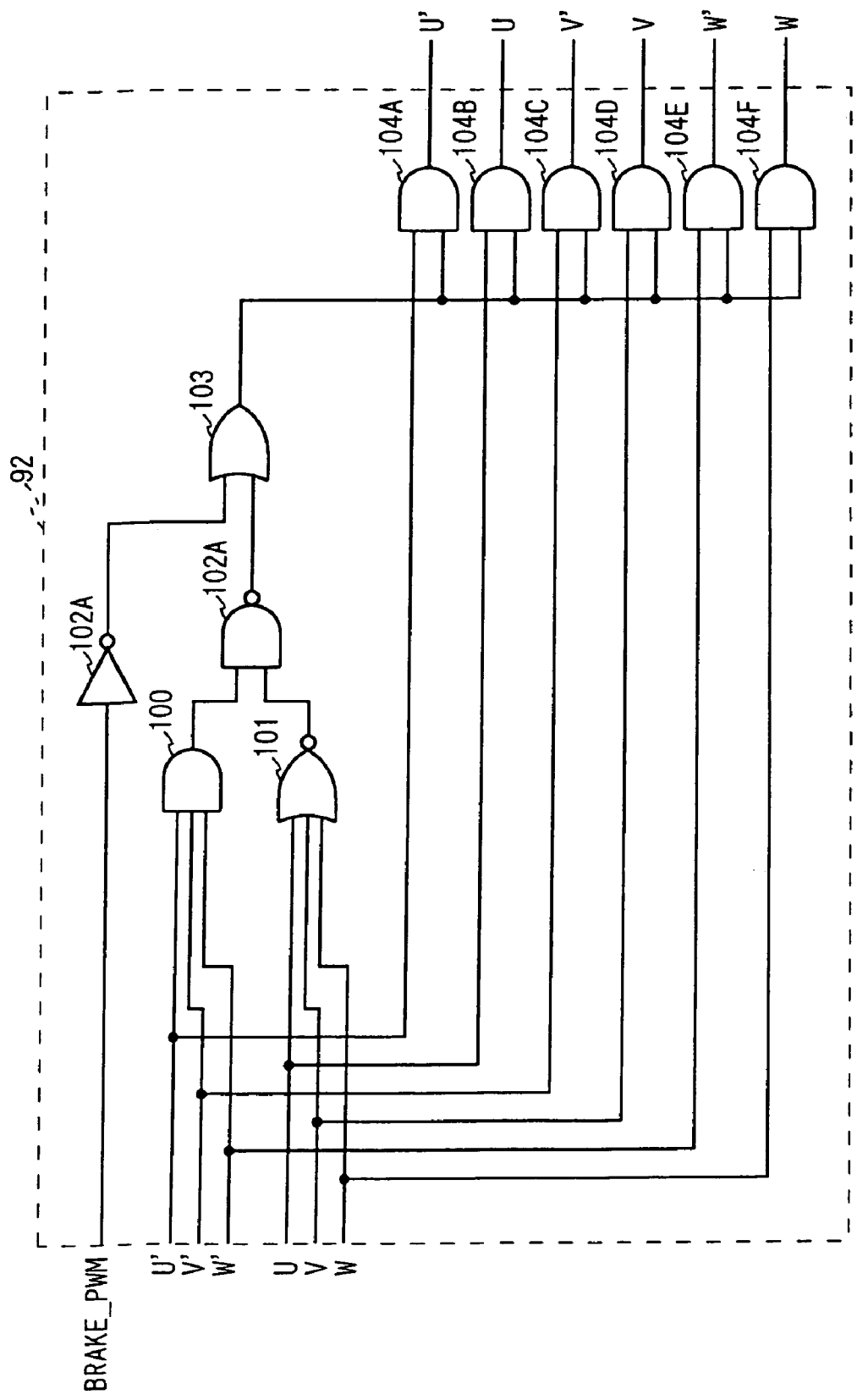
FIG. 20 is a specific view showing the construction of an additional logical circuit 92.

FIG. 20 shows the specific construction of the additional logical circuit 92. An AND gate 100 performs AND operation on the first, third and fifth PWM signals S13u1, S13v1, and S13w1 from the PWM control unit 91 while an exclusive NOR gate 101 performs exclusive NOR operation on the second, fourth, and sixth PWM signals S13u2, S13v2, S13w2.

Then, a NAND gate 102B performs NAND operation on the output of the AND gate: 100 and the output of the exclusive NOR gate 101, and an OR gate 103 performs OR operation on the output of the NAND gate 102B and the output of an inverting buffer 102A, i.e., the signal opposite the BRAKE_PWM control signal S14.

Then, first to sixth AND gates 104A to 104F perform AND operation on the output of the OR gate 103 and the original first to sixth PWM signals S13u1, S13u2, S13v1, S13v2, S13w1, S13w2, respectively, and the outputs of these first to sixth AND gates 104A to 104F are given to the PNP transistor TRu1, NPN transistor TRu2, PNP transistor TRv1, NPN transistor TRv2, PNP transistor TRw1, and NPN transistor TRw2, respectively.

As described with reference to FIG. 18, by putting the terminals P4, P5, P6 of the coils 68u, 68v, 68w in the short state while the coils are nonconductive, the drive currents Iu, Iv, Iw of the coils 68u, 68v, 68w take a longer time to become zero because of the excessive response. Therefore, while, the coils 68u, 68v, 68w are nonconductive, current starts to flow before the drive currents Iu, Iv, Iw become zero, by repeatedly switching the open state and the short state.

Therefore, the maximum values of the drive currents Iu, Iv, Iw to be supplied to the coils 68u, 68v, 68w gradually increase every time when the coils 68u, 68v, 68w become conductive and nonconductive, and the increasing rate almost corresponds to a duty cycle, that is, a rate in which the BRAKE_PWM control signal S14 becomes a logical level "1". Similarly, the effective values of the drive currents Iu, Iv, Iw of the coils 68u, 68v, 68w also. gradually increase and the increasing rate almost corresponds to the duty cycle, that is, a rate in which the BRAKE_PWM control signal S14 becomes a logical level "1".

In addition, since the output torque of the motor unit 60 is calculated by multiply a torque constant Kt of the motor unit 60 and a sum of the values of the drive currents Iu, Iv, Iw to be supplied to the coils 68u, 68v, 68w. Therefore, when the coils 68u, 68v, 68w are repeatedly switched between the conductive state and the nonconductive state, the effective value of the output torque in the motor unit 60 increases with increasing the sum of the values of the drive currents Iu, Iv, Iw.

The increasing rate of this case almost corresponds to the duty cycle of the BRAKE_PWM control signal S14, that is, a rate in which the BRAKE_PWM control signal S14 becomes a logical level "1". And the inclination of increase of the output torque of the motor unit 60 is in proportion to the viscosity coefficient of the motor unit 60. In other words, the viscosity coefficient of the motor unit 60 can be dynamically and optionally determined within a range of duty resolution with the duty cycle of the BRAKE_PWM control signal S14.

As a result, the viscosity coefficient of the motor unit 60 can be controlled by changing the duty cycle of the BRAKE_PWM control signal S14, and the currents (the amount of charge) to flow in the coils 68u, 68v, 68w can be controlled while the coils 68u, 68v, 68w are nonconductive.

When the duty cycle of the BRAKE_PWM control signal S14 is determined so that the viscosity coefficient becomes large, the motor unit 60 has high holding power, resulting in reducing disturbance such as cogging torque. In addition, the amount of compliance toward an external force can be controlled.

Figure 21:
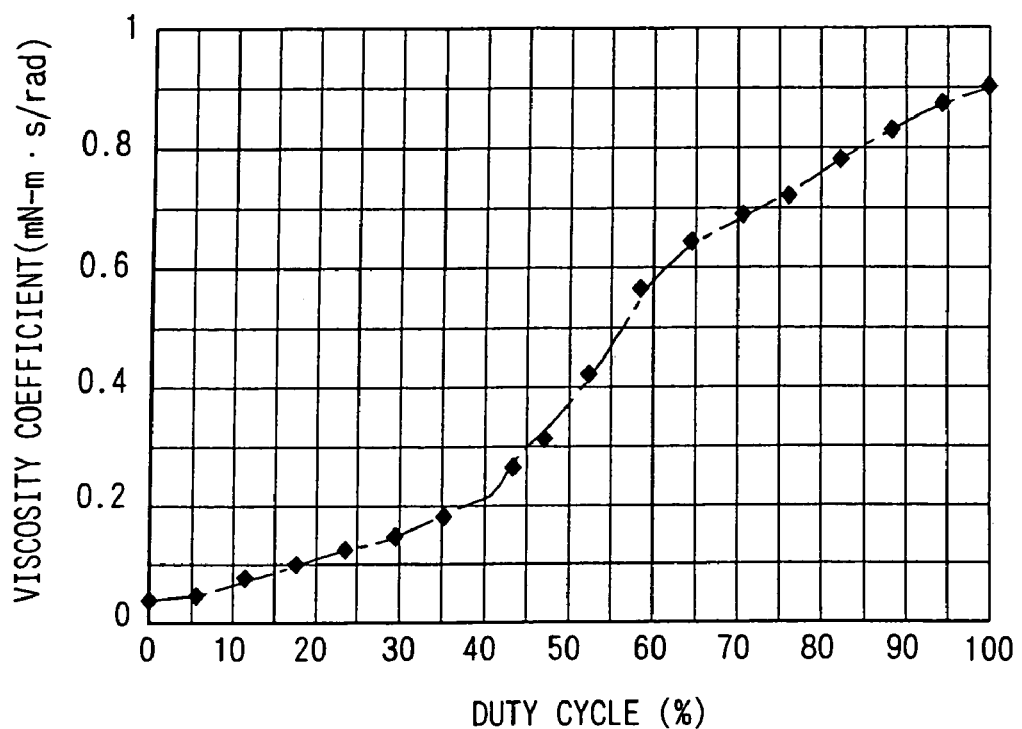
FIG. 21 is a view showing a relationship between a duty cycle of the BRAKE_PWM control signal S14 and a viscosity coefficient of a motor unit 60.

The PWM control of the duty cycle of the BRAKE_PWM control signal S14 to be supplied to the additional logical circuit 92, which is performed by the PWM control unit 91, adjusts a ratio of the period for the open state to the period for the short state in the terminals P4, P5, P6 of the coils 68u, 68v, 68w while the coils are nonconductive, thereby obtaining desired compliance. FIG. 21 shows a relationship between the duty cycle of the BRAKE_PWM control signal S14 and the viscosity coefficient of the motor unit 60.

(4) Load Absorbing Mechanism in Each Actuator $A_1$ to $A_{24}$

An advanced two-legged walking robot autonomously walks and moves. Further, the robot can make motion such as standing up from a lying state and holding and carrying objects with its arms. On the other hand, such case may arise that overload is applied to joint actuators due to falling down, dumping into something, or getting something into its body. Such overload may cause fatal damage such as breakage or plastic deformation of the body. Therefore, it is very important to provide each motor composing the joint actuators with a mechanism to absorb load.

First, a load absorbing function which is provided in each actuator $A_1$ to $A_{24}$ for joint motion in this robot 1 will be described.

Figure 22:
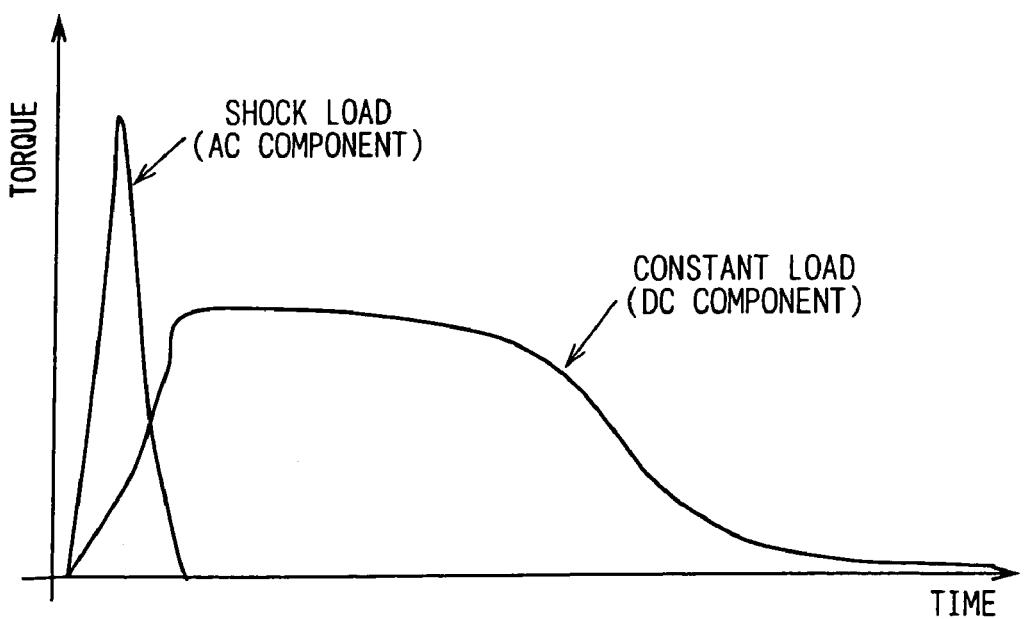
FIG. 22 is a view showing AC component and DC component of a load torque applied to an actuator.

The inventors of this invention treat load torque to be applied to a motor for a joint actuator by broadly classifying it into impulsive "shock load" which incurs distortion energy and may break members such as links, due to bumping or the like and "constant load" which is relatively high load torque, although not so high as the shock load, and causes plastic deformation (see FIG. 22) if constantly applied for a prescribed period of time or longer. The latter constant load torque value is a value around a stall torque of a motor used, or a threshold value such as a limitation for circuit protection. The inventors position the shock load and the constant load as AC component and DC component, respectively.

The constant load, that is, the DC component of a load torque is detected based on the sum of absolute values of a load torque to be applied to a link connected to the output shaft of an actuator motor and a generated torque by the actuator motor. Then, it is recognized that the DC component is excessive in a case where the total torque exceeds a threshold value which may cause plastic deformation when applied for a prescribed period of time or longer. Since the generated torque of a motor is in proportion to motor current, the torque can be measured by converting the motor current into a voltage.

Figure 23:
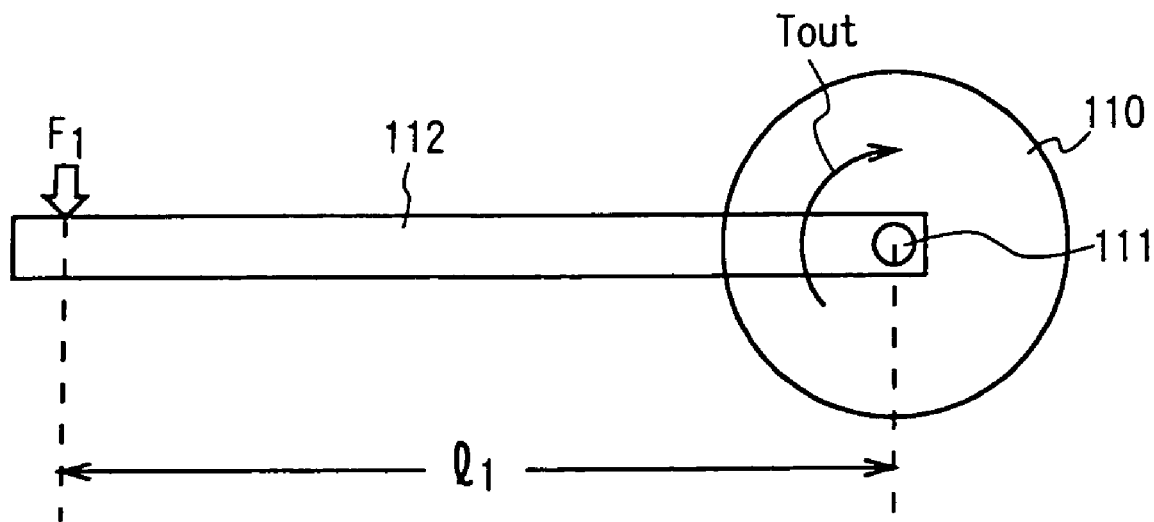
FIGS. 23 and 24 are drawings explaining a mechanism of absorbing load according to this invention.

For example, as shown in FIG. 23, suppose that, in a situation where a link 112 of which one end is linked with the output shaft 111 of an actuator 110 can not move because it's the other end (which is L1 distant from the output shaft 111) is contacting with a wall or an entity, the other end of the link 112 is given an external force F1 from the wall or the entity and the actuator 10 generates a torque by the newly increased load.

In this case, a condition where the actuator 110 is not broken is as follows:

$$F1 \times L1 + T_{OUT} \leq T_{BRK} \tag{1}$$

where $T_{out}$ is the generated torque being generated firstly by the actuator 110 and $T_{BRK}$ is a load torque which will break the actuator 110 if applied to the output shaft 111 of the actuator 110. That is, the condition is that the sum of absolute values of a load torque newly caused by an external force F1 and the generated torque $T_{out}$ by the actuator 110 does not exceed $T_{BRK}$ for a prescribed period of time or longer.

Such generated torque $T_{out}$ corresponds to the DC component of load and is referred to as "static load torque" hereinafter. Based on the above equation (1), by controlling the generated torque $T_{out}$ of the actuator 110 so as to satisfy the following equation, the actuator 110 can be previously prevented from being broken.

$$T_{OUT} \leq T_{BRK} - F1 \times L1 \tag{2}$$

Figure 27:
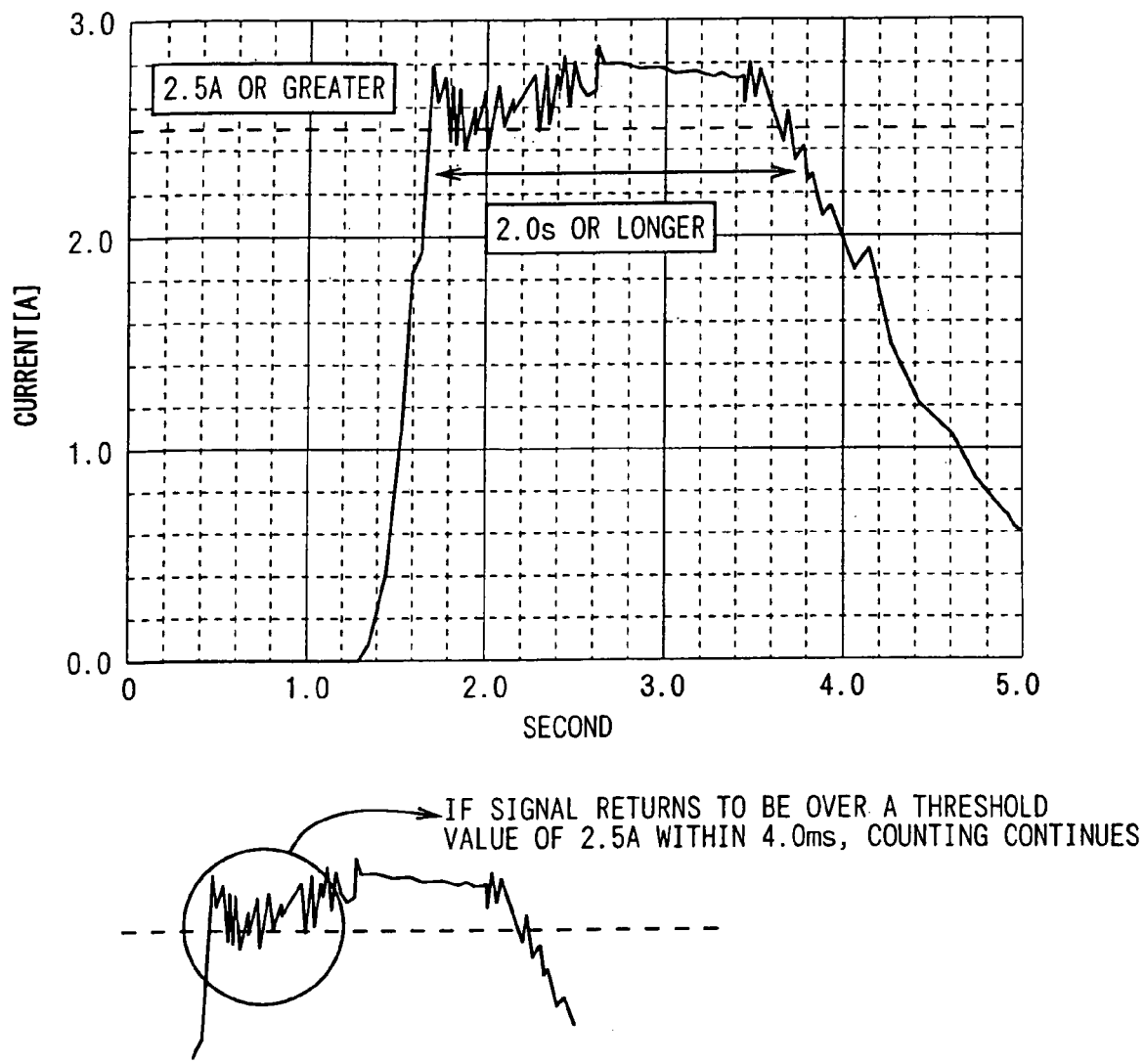
FIG. 27 is a view showing an example of a result of torque detection.

The generated torque $T_{out}$ of the actuator 110 can be detected as a coil current supplied to the actuator 110. Now, FIG. 27 shows current values corresponding to torque, where a threshold value for the coil current into which a threshold value for a load torque is converted is 2.5 A and a time limit for continuous of this threshold value is 2.0 seconds. Continuous sampling of current values have a chattering problem. That is, even a value greater than 2.5 A actually continues for 2.0 seconds, a counter is reset because of the chattering every time when the value falls below the threshold value, which may miss detection timing. For such a case, such operation can be effective that, if a period of time when the value is below the threshold value is very short (for example, for only 4.0 milliseconds or shorter), the counter keeps on counting.

As to the shock load, that is, the AC component of load, on the other hand, the inventors introduced a fact in that the variation of kinetic energy to be applied to the output shaft of a motor is in proportion to a product of a torque to be applied to the motor and the angular velocity. In addition, since the kinetic energy is almost equal to distortion energy added to the output shaft member, a load torque corresponding to a shock is detected based on the variation of the kinetic energy, and the AC component of load is recognized excessive when the load torque exceeds a threshold value which may break a member.

Figure 24:
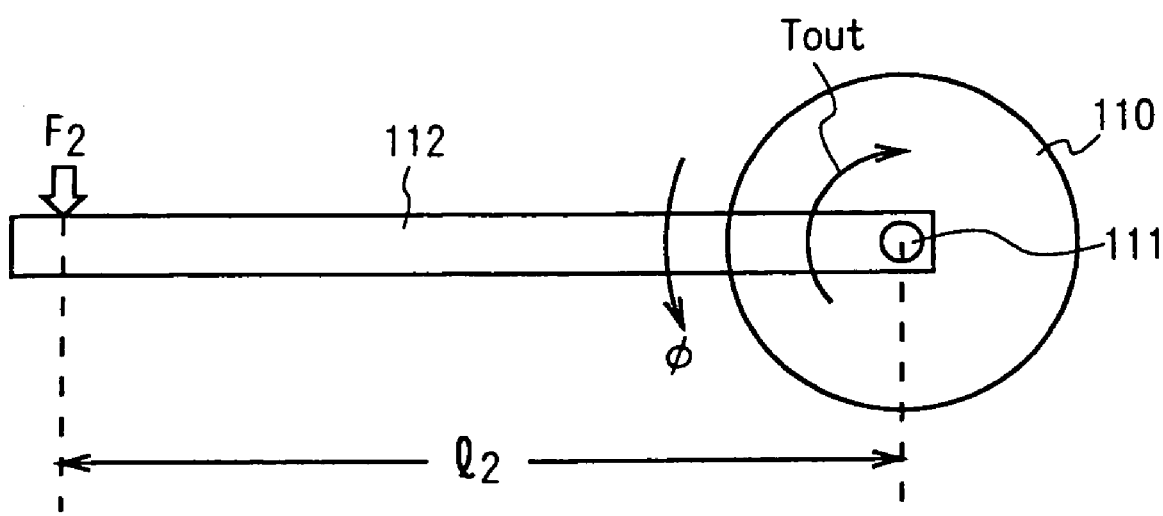

For example, a case shown in FIG. 24 will be considered where such a load torque as to rotate the link 112 is applied to the other end of the link 112 (which is L2 distance from the output shaft 111) due to, for example, an entity falling on the other end. Such a load torque corresponds to the AC component of load and is referred to as "dynamic load torque" hereinafter.

Kinetic energy $K_E$ of this time, which is applied to the link 112 by the dynamic load torque, is derived from the follows:

$$K_E = \frac{1}{2} \times J \times \dot{\phi}^2 \qquad (3)$$

where φ is a rotation angle of the link 112 and J is an inertia moment of the link 112.

Assuming that all of this kinetic energy $K_E$ travel to the actuator 110 through the output shaft 111 and are converted into distortion energy. This distortion energy does not break the actuator 110 when it is under an elastic limit in the actuator 110; and the distortion energy breaks the actuator 110, otherwise.

When the distortion energy becomes over the elastic limit, the generated torque $T_{out}$ of the actuator 110 is reduced in order to prevent the breakage of the actuator 110 due to the dynamic load torque.

Specifically, to detect the variation of the kinetic energy $K_E$ of the dynamic load torque applied to the link 112, the equation (3) is single-differentiated with respect to time as follows:

$$\frac{d}{dt}(K_E) = I \times \ddot{\phi} \times \dot{\phi} = \tau \times \dot{\phi} \qquad (4)$$

where τ represents an output torque of the actuator 110. That is, since the variation of energy is in proportion to a product of the torque applied to the motor and the angular velocity, the load torque is detected based on the variation of energy, and the AC component of load is recognized excessive when the load torque exceeds a threshold value that may break a member.

Now, since the AC component of a load torque is impulsive (refer to FIG. 4), the component reaches an overload state at moment and therefore, a load absorbing operation may not be carried out in time. As described above, if based on a characteristic in which the variation of energy is in proportion to a product of a torque applied to a motor and the angular velocity, overload can not be detected until the torque reaches an overload state, which arises a problem in response.

Therefore, the variation of energy is not measured simply, but the inclination of the variation is considered by double differentiation of the energy with respect to time. Then, it is predicted that the torque will reach an overload state if the inclination is more than a prescribed value, with the result that the load absorbing operation can be carried out with good response. The equation (4) is further differentiated with respect to time as follows (that is, the aforementioned equation (3) is double-differentiated with respect time t):

$$\frac{d^2}{dt^2}(K_E) = \dot{\tau} \times \dot{\phi} + \tau \times \ddot{\phi} \qquad (5)$$

The equation (5) represents acceleration of variation of the kinetic energy $K_E$. When the right-hand side of the equation (5) is a prescribed threshold value or greater which is a boarder between the elastic range and the plastic range of each member in the actuator 110, the generated torque $T_{out}$ of the actuator 110 is reduced in order to previously prevent breakage of the actuator 110.

However, the double differentiation process like the equation (5) is not simple. In addition, the inventors realized that the second item of the right-hand side in the equation (5) makes a small contribution to the operation result. Therefore, the second item is omitted and the right-hand side of the equation (5) is made approximate to the product of the first item of the right-hand side and a prescribed gain $G_k$, as follows:

$$f(t) = G_k \times \tau \times \dot{\phi} \qquad (6)$$

where f(t) is an evaluation function.

Figure 34:
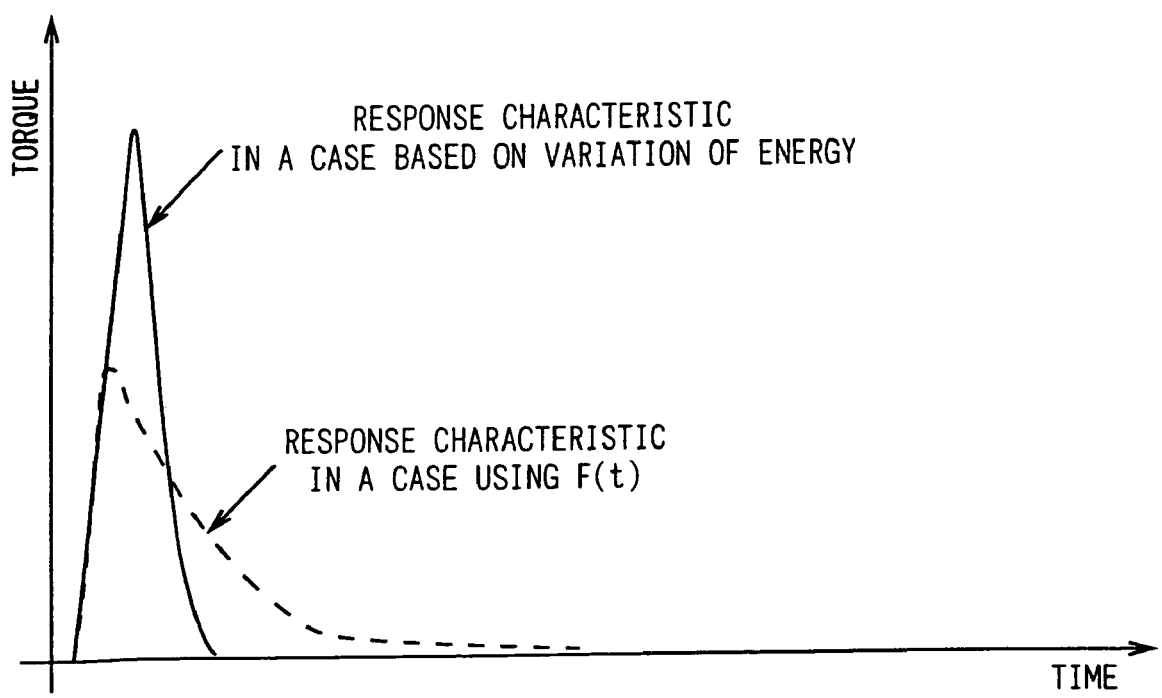
FIG. 34 is a graph of a response characteristic of the load absorbing mechanism.

The generated torque $T_{out}$ is reduced when the evaluation function f(t) becomes over the above-described threshold value. As a result, the actuator 110 can be previously prevented from being broken, with the simpler arithmetic process. FIG. 34 shows a comparison in a response characteristic of the load absorbing mechanism between a case based on the variation of kinetic energy $K_E$ and a case in which the evaluation function f(t) is introduced. As clear from this figure, the latter case can detect an overload state with a better response at a time of a lower generated torque.

The control substrate 77 operates as a load absorbing means for preventing breakage of the actuators $A_1$ to $A_{24}$ due to the static or dynamic load torque, which was described with reference to FIG. 23 and FIG. 24, based on the aforementioned principles. As shown in FIG. 16, a voltage detection unit 82 for detecting as voltage $V_i$ the amount of a current $I_{R1}$ flowing in a power line LIN for the drive circuit 81 is provided on the printed wiring board of the control substrate 77.

The voltage detection unit 82 is formed of a first resistance $R_1$ provided on the power line LIN and a differential amplifier 84 composed of second to fifth resistances $R_2$ to $R_5$ and an operational amplifier 83. The differential amplifier 84 detects a fall voltage $V_i$ in the first resistance $R_1$ and sends the detected result to the control IC 80 as a voltage signal S11.

Since the voltage $V_i$ is in proportion to the current $I_{R1}$ flowing in the first resistance $R_1$ and this current $I_{R1}$ is in proportion to the left-hand side of the equation (1), the voltage $V_i$ is also in proportion to the left-hand side of the equation (1). Now, it is supposed that the following equation is realized:

$$F1 \times L1 + T_{out} = K_{vi} \times V_i \leq T_{BRK} \qquad (7)$$

where $K_{vi}$ is a proportionality constant.

Therefore, the actuator $A_1$ to $A_{24}$ can be prevented from being broken due to a static load torque by controlling the PWM control unit 91 so as to satisfy the following equation:

$$V_i \leq \frac{T_{BR}}{K_{vi}} \qquad (8)$$

Figure 25:
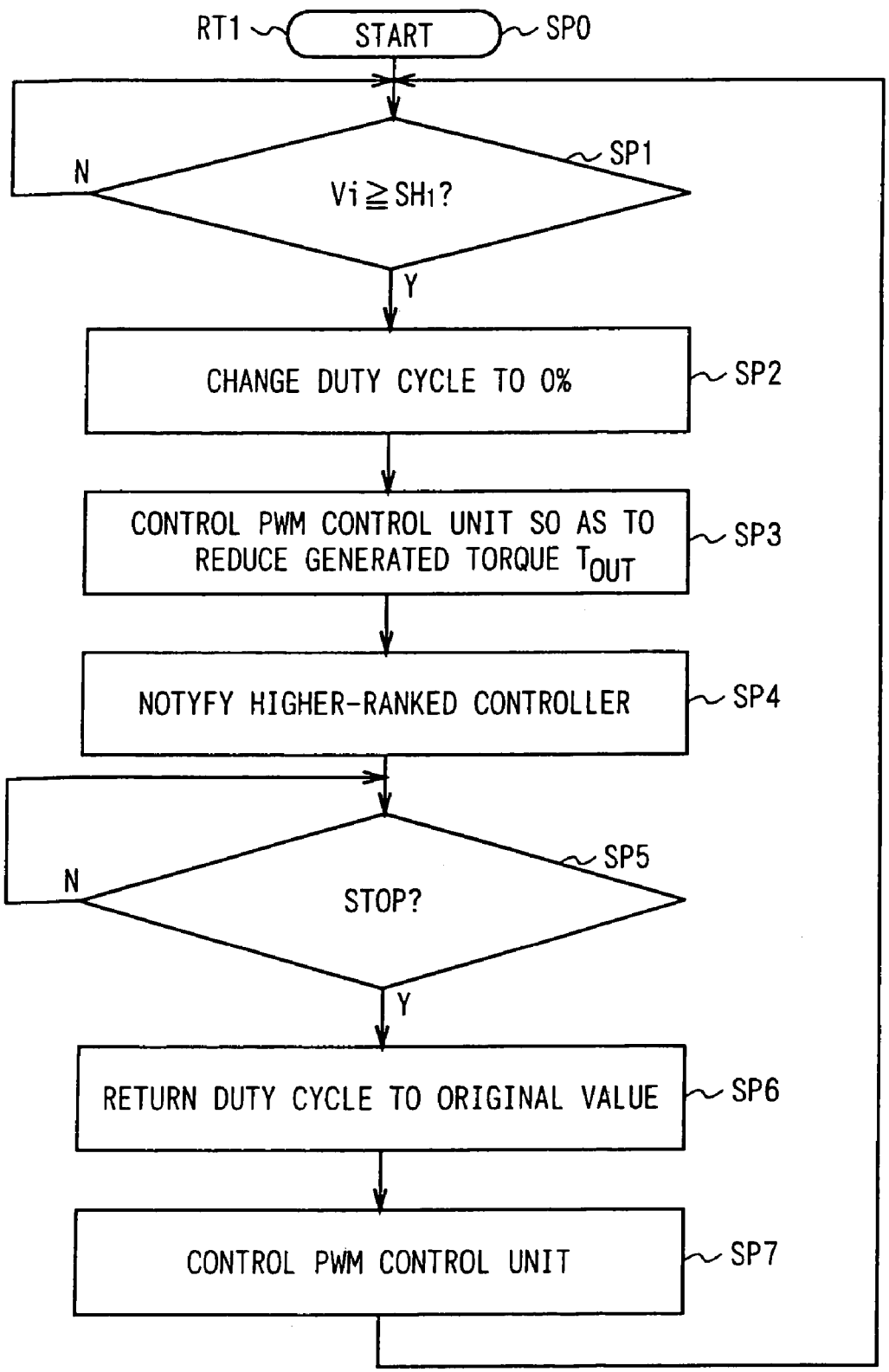
FIG. 25 is a flowchart showing a first load absorbing processing procedure RT1 to be carried out by an arithmetic processing unit 90 of the control IC 80.

FIG. 25 is a flowchart of the first load absorbing processing procedure RT1 which is performed by the arithmetic processing unit 90 of the control IC 80. The arithmetic processing unit 90 controls the PWM control unit 91 based on the voltage signal S11 given from the voltage detection unit 82 so as that the voltage $V_i$ does not exceed a prescribed preset first threshold value SH1 ($T_{BRK}/K_{vi}$ in the equation (8)), which prevents the actuator $A_1$ to $A_{24}$ from being broken in a case where the static load torque, that is, the DC component of the load is applied to the corresponding link.

The arithmetic processing unit 90 starts the first shock absorbing processing procedure RT1 from step SP0, in parallel to the positional control of the corresponding motor unit 60 based on the operation command COM given from the higher-ranked controller as described above, and judges at step SP1 whether the voltage $V_i$ obtained based on the voltage signal S11 given from the voltage detection unit 82 is the first threshold value SH1 or greater. When a negative result is obtained at step SP1, the arithmetic processing unit 90 repeats this step SP1 until an affirmative result is obtained.

Then, when an affirmative result is obtained at step SP1 by, for example, applying a static load torque to the corresponding link due to contact of the link with a wall or an entity, the arithmetic processing unit 90 goes on to step SP2 to control the PWM control unit 91 so as to increase the compliance of the corresponding motor unit 60 by changing the duty cycle of the BRAKE_PWM control signal S14 to 0%, and then goes on to step SP3 to control the PWM control unit 91 so as to reduce the effective value of the current which flows in each coil 68$u$, 68$v$, 68$w$ of the motor unit 60, thereby obtaining reduced generated torque $T_{out}$.

Then, the arithmetic processing unit 90 goes on to step SP4 to inform the higher-ranked controller of the execution of the shock absorbing process (steps SP2 and SP3), and goes on to step SP5 to wait for an instruction to stop the shock absorbing process from the higher-ranked controller.

When the arithmetic processing unit 90 receives such notification from the higher-ranked controller and therefore obtains an affirmative result at step SP5, it proceeds to step SP6 to change the duty cycle of the BRAKE_PWM control signal S14, that is, the motor viscosity coefficient, to the original value by controlling the PWM control unit 91 and thereby return the compliance of the motor unit 60 to the state before the shock is detected. Then, the arithmetic processing unit 90 proceeds to step SP7 to control the PWM control unit 91 to return the effective value of the drive current Iu, Iv, Iw to be applied to each coil 68$u$, 68$v$, 68$w$ of the motor unit 60 to the original value, with the result that the generated torque $T_{out}$ has a prescribed value. Then, the arithmetic processing unit 90 returns back to step SP1 to repeat the above processes.

As described above, the arithmetic processing unit 90 controls the motor viscosity coefficient and the generated torque $T_{out}$ of the motor unit 60 in the corresponding actuator $A_1$ to $A_{24}$ when a static load torque is applied to a corresponding link.

On the other hand, as is clear from the equation (6), the output torque τ of the actuator $A_1$ to $A_{24}$ is in proportion to the current $I_{R1}$ flowing into the resistance $R_1$ in the voltage detection unit 82 and the current $I_{R1}$ is in proportion to the fall voltage $V_i$ due to the first resistance $R_1$. Therefore, the equation (6) can be transformed into:

$$f(t) = G_k \times \dot{\tau} \times \dot{\phi} = G_k \times \frac{d\tau}{dt} \times \frac{d\phi}{dt} = K_i \times \frac{dV_i}{dt} \times K_8 \times \frac{d\phi}{dt} \qquad (9)$$

where $K_i$ and $K_\theta$ are proportionality constants.

As is clear from the equation (9), the evaluation function f(t) in the equation (6) is derived by a product of a result of multiplying the temporal variation of voltage $V_i$, detected by the voltage detection unit 82, and the proportionality constant $K_i$ and a result of multiplying the amount of temporal change of the rotational position ϕ of the rotor shaft 64 of the motor unit 60, detected by the encoder 76, and the proportionality constant $K_\theta$.

Figure 26:
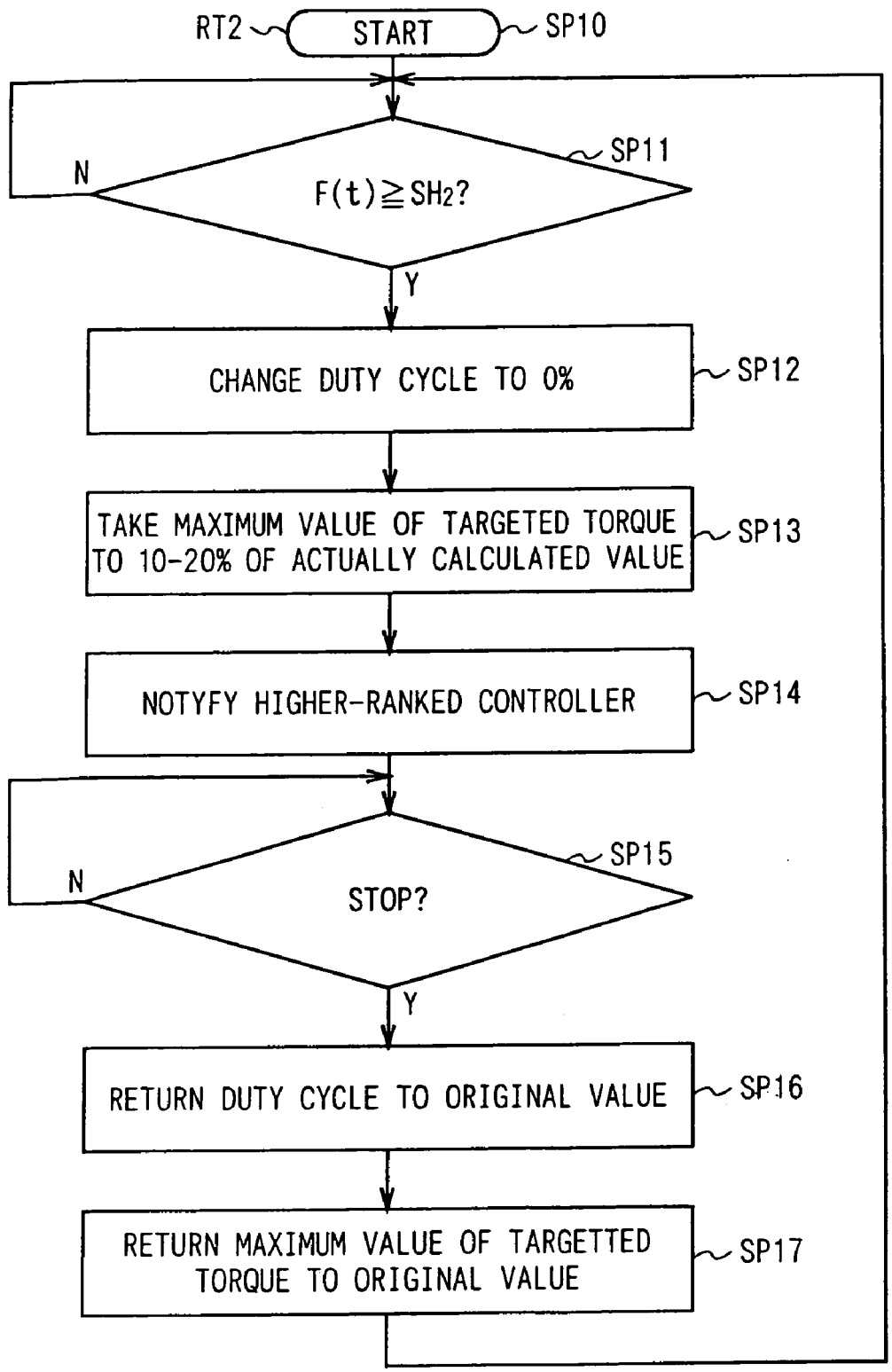
FIG. 26 is a flowchart showing a second load absorbing processing procedure RT1 to be carried out by an arithmetic processing unit 90 of the control IC 80.

FIG. 26 shows a flowchart of a second load absorbing processing procedure RT2 which is performed by the arithmetic processing unit 90 of the control IC 80. The arithmetic processing unit 90 prevents the actuator $A_1$ to $A_{14}$ from being broken in a case where a dynamic load torque, that is, the AC component of load, is applied to a corresponding link, by controlling the PWM control unit 91 following the second load absorbing processing procedure RT2, based on a voltage $V_i$ and a rotational position ϕ of the rotor shaft 64 of the motor unit 60 so that the evaluation function f(t) does not exceed a preset prescribed second threshold value SH2, the voltage $V_i$ obtained based on the voltage signal S11 given from the voltage detection unit 82, the rotational position ϕ obtained based on the first and second position signals S10A, S10B given from the encoder 76.

In parallel to the first shock absorbing processing. procedure RT1, the arithmetic processing unit 90 starts the second shock absorbing processing procedure RT2 from step SP10. At step SP11, the arithmetic processing unit 90 calculates the equation (9) based on the voltage signal S11 and the position signals S10A, S10B and then judges whether the result is the second threshold value SH2 or greater. Note that, in this embodiment, $K_i$ and $K_\theta$ are taken to 1.0 and 4.0, respectively, and the second threshold value SH2 is taken to be a value between 1.3 and 4.0 mN·m·rad/S2 which is considered to be most optimal from experiment. The arithmetic processing unit 90 repeats this step SP11 until an affirmative result is obtained.

When the corresponding link receives a shock and thereby an affirmative result is obtained at step SP1, the arithmetic processing unit 90 goes on to step SP12 to change the duty cycle of the BRAKE_PWM control signal S14 to 0% to increase the compliance of the motor unit 60 by controlling the PWM control unit 91. Then, at next step SP13, the arithmetic processing unit 90 controls the PWM control unit 91 to create the generated torque $T_{out}$ so that the maximum value of the targeted torque calculated based on the operation command from the higher-ranked controller takes a value between 10 to 20% of the actually calculated value.

Next, the arithmetic processing unit 90 goes on to step SP14 to inform the higher-raked controller of the execution of the shock absorbing process (steps SP12 and SP13) and goes on to SP15 where it waits for an instruction to stop the shock absorbing process from the higher-ranked controller.

When the arithmetic processing unit 90 receives such a notification from the higher-ranked controller and thereby an affirmative result is obtained at step SP15, it proceeds to step SP16 to return the duty cycle of the BRAKE_PWM control signal S14, that is, the motor viscosity coefficient to the original value by controlling the PWM control unit. 91 to return the compliance of the motor unit 60 to a state before the shock is detected. Then, at step SP17, the arithmetic processing unit 90 returns the effective value of the drive current Iu, Iv, Iw to be applied to each coil 68*u*, 68*v*, 68*w* of the motor unit 60 to the original value by controlling the PWM control unit 91 in order to thereby return the generated torque $T_{out}$ to the prescribed value. Then, the arithmetic processing unit 90 returns back to step SP11 and repeats the aforementioned processes.

As described above, the arithmetic processing unit 90 controls the motor viscosity coefficient and the generated torque of the motor unit 60 in the corresponding actuator in a case where a dynamic load torque is applied to the corresponding link.

In the aforementioned mechanism, in this robot 1, when a static or dynamic load torque which may break any actuator $A_1$ to $A_{24}$ is applied to a corresponding link connected with the output shaft 75 of the actuator, the compliance of the actuator $A_1$ to $A_{24}$ increases and the output torque of the actuator $A_1$ to $A_{24}$ decreases, resulting in deformation of the link according to the load torque.

Figure 1:
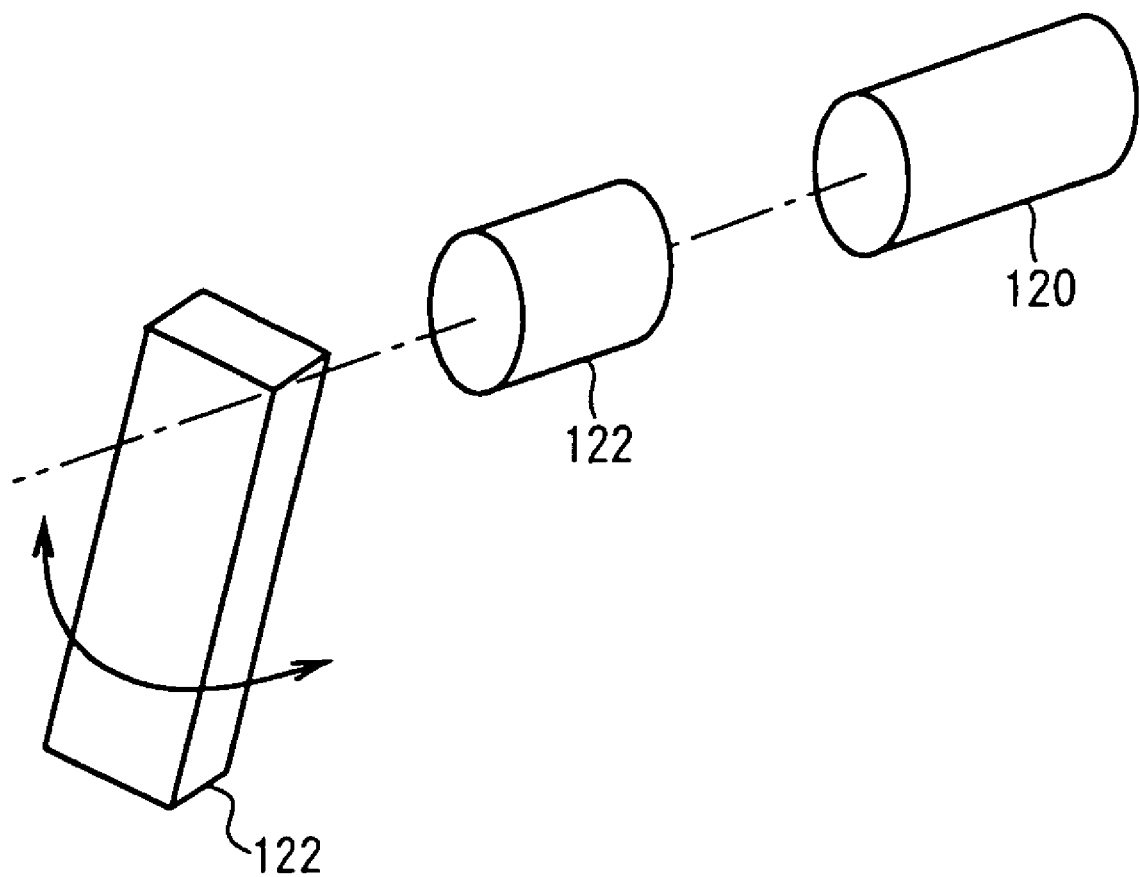
FIG. 1 is a conceptual drawing explaining motion of a movable part in a conventional robot.
Figure 2:
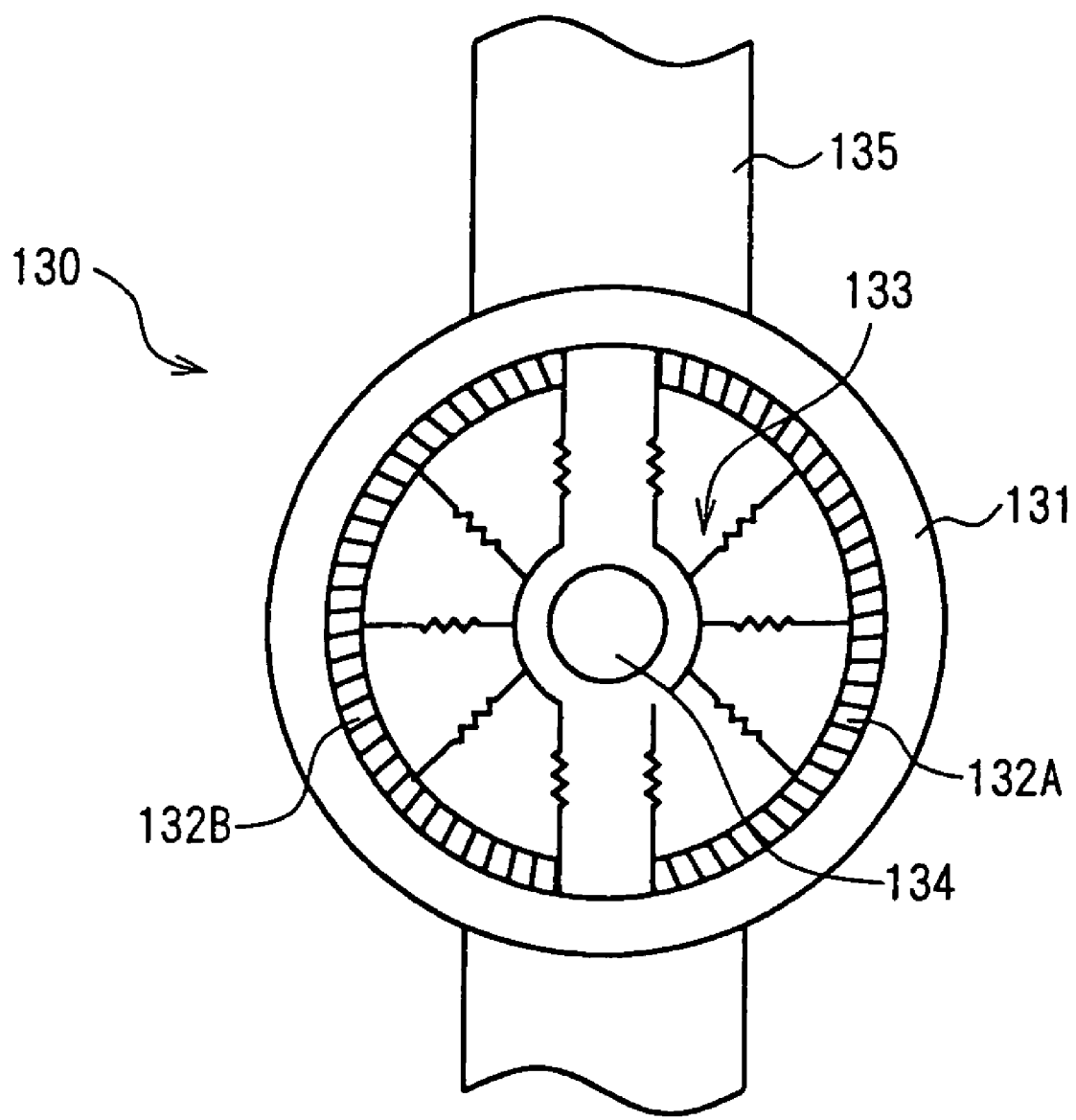
FIG. 2 is a conceptual drawing schematically showing the construction of a conventional torque limiter.

For example, this robot 1 is capable of previously preventing damage of the actuators $A_1$ to $A_{24}$ due to shock as in the case where a conventional torque limiter 130 is used as described with reference to FIG. 1, and in addition, the load absorbing is performed only by controlling the electrical actuators $A_1$ to $A_{24}$. As compared with the case of using the conventional torque limiter 130 having a mechanical construction, the actuators $A_1$ to $A_{24}$ do not have big differences in performance regarding the shock absorbing function and also are lightly affected by temperature.

In addition, the control IC 80 can control the load absorbing operation as well as performing the usual positional control of the actuators $A_1$ to $A_{24}$. That is, since new units are not required, the actuators $A_1$ to $A_{24}$ can be constructed simpler, smaller and lighter, as compared with the conventional torque limiter 130 having the mechanical construction.

According to the above construction, a sum of absolute values of a static load torque applied to a link connected to the output shaft 75 of an actuator $A_1$ to $A_{24}$ and the generated torque of the actuator $A_1$ to $A_{24}$ is obtained as a voltage $V_i$, and when the sum is the first threshold value SH1 or greater, the actuator $A_1$ to $A_{24}$ is controlled so as to reduce the generated torque. In addition, a variation of energy of a dynamic load torque applied to the link is detected, and when the detected variation is the prescribed second threshold value SH2 or greater, the actuator $A_1$ to $A_{24}$ is controlled so as to reduce the generated torque. Therefore, as compared with the conventional torque limiter 130 having the mechanical construction, the actuators $A_1$ to $A_{24}$ do not have big differences in performance regarding the load absorbing function and are lightly affected by temperature, thus making it possible to realize a easy-to-use load absorbing apparatus.

In addition, by using the load absorbing apparatus according to this invention, the actuator $A_1$ to $A_{24}$, that is, the entire system can be constructed simpler, smaller and lighter, as compared with the conventional torque limiter 130 having the mechanical construction.

(5) Load Absorbing Mechanism for the Entire Robot

When overload is applied to a single axis of an actuator motor, the aforementioned load absorbing mechanism for the actuator $A_1$ to $A_{24}$ is effective to appropriately absorb the AC component and the DC component of the load, so as to prevent breakage of the motor and members such as a link connected to the output shaft of the motor and therefore avoid the spreading of damage into other members.

On the other hand, multi-joint type robot including leg-type walking robot is composed of a plurality of motors for joint actuators and links connected with the output shafts of the motors. Therefore, such situation may occur that loads in plural motors are totally excessive even load in each motor is not excessive. For this situation, a load absorbing operation for the entire body is considered to be required, separately from the load absorbing operation for each motor.

Therefore, in the robot 1 of this embodiment, in parallel to execution of absorbing a static and dynamic load torque in each actuator motor, it is monitored whether loads in two or more motors are totally excessive. As a result, it can be detected whether a prescribed part such as arms and legs or the entire body is in an overload state or not, even each motor is not in an overload state.

When it is detected that loads in a plurality of motors are totally excessive, not the load absorbing operation for each motor but the body protection operation to eliminate the overload state of the entire body is performed. The body protection operation here includes cutoff of power to relevant motors or all motors of the body and weakening of the relevant motors or all motors of the body. The weakening of a motor is realized by setting a generated torque to zero or decreasing a viscosity resistance of a motor by gain adjustment.

Figure 28:
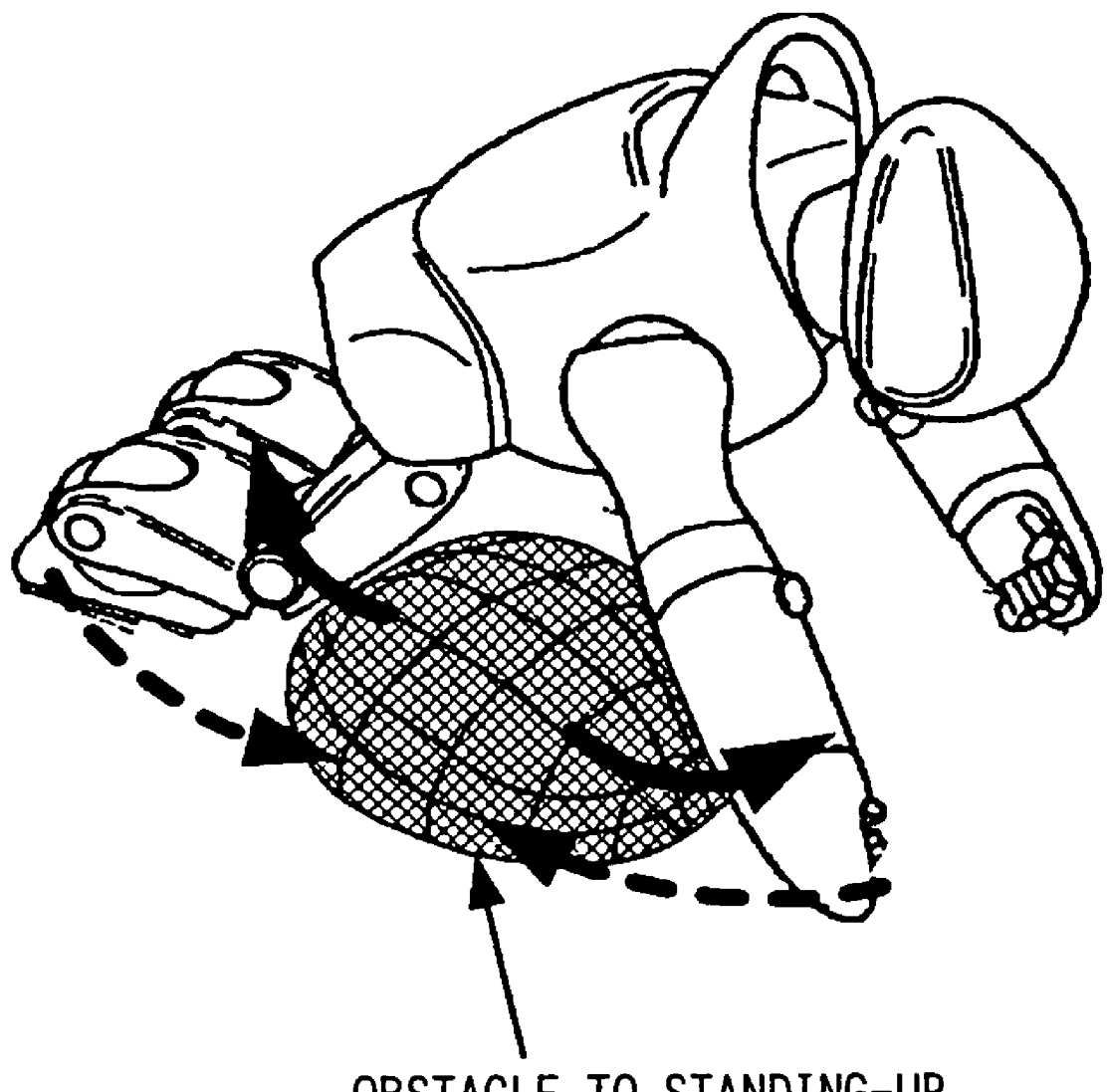
FIG. 28 is a drawing showing a situation in which the robot 1 puts something between the legs in the middle of standing up from a lying position.

For example, FIG. 28 shows a situation where the robot 1 is trying to stand up. However, the robot's leg touches an obstacle and if the robot 1 keeps on standing up, reactive forces are applied in directions shown by solid line arrows. As a result, loads are applied to the pitch of the right shoulder, the roll and pitch of the right thigh, and the pitch of the right ankle. In this case, the loads do not break any axis but may cause plastic deformation in a frame of the body or damage of its cover.

In order to detect such situation, each current for consuming the actuator load in each axis in a joint is detected and all currents are summed up in a higher-ranked control system and the total current is monitored as total load in the entire body.

Specifically, a load torque T in each axis of a motor is derived from a product of $K_{vi}$ and $V_i$ from equation (7), that is, the torque is monitored based on a voltage applied to the motor. Therefore, the total $T_{sum}$ of load torques in the entire body is derived as follows:

$$T_{sum} = \sum_{k=1}^{24} T_k \qquad (10)$$

Where k-numbered actuator is $A_k$ (note that, $1 \leq k \leq 24$) and its load torque is $T_k$.

In a case where the robot 1 stands up as shown in FIG. 28, large load is applied to the actuators $A_5, A_9$ of the pitch axes of the right and left shoulder joints, the actuators $A_{14}, A_{20}$ of the roll axes of the right and left hip joints, the actuators $A_{15}$, $A_{21}$ of the pitch axes of the hip joints, and the actuators $A_{17}$, $A_{23}$ of the roll axes of the right and left ankle joints, and the total load torque $T_{sum}$ is derived as follows:

$$T_{sum} = \sum_{k=1}^{24} T_k = \begin{pmatrix} T_5 + T_9 + T_{14} + T_{20} + T_{15} + \\ T_{21} + T_{17} + T_{23} \end{pmatrix} + O(T_k) \quad (11)$$

In this equation, the total load torque in the other joint actuators $O(T_k)$ can be ignored.

When the total load torque $T_{sum}$ exceeds a prescribed threshold value for a prescribed period of time, the body protection operation such as shutdown is carried out in order to avoid breakage of the body.

Figure 29:
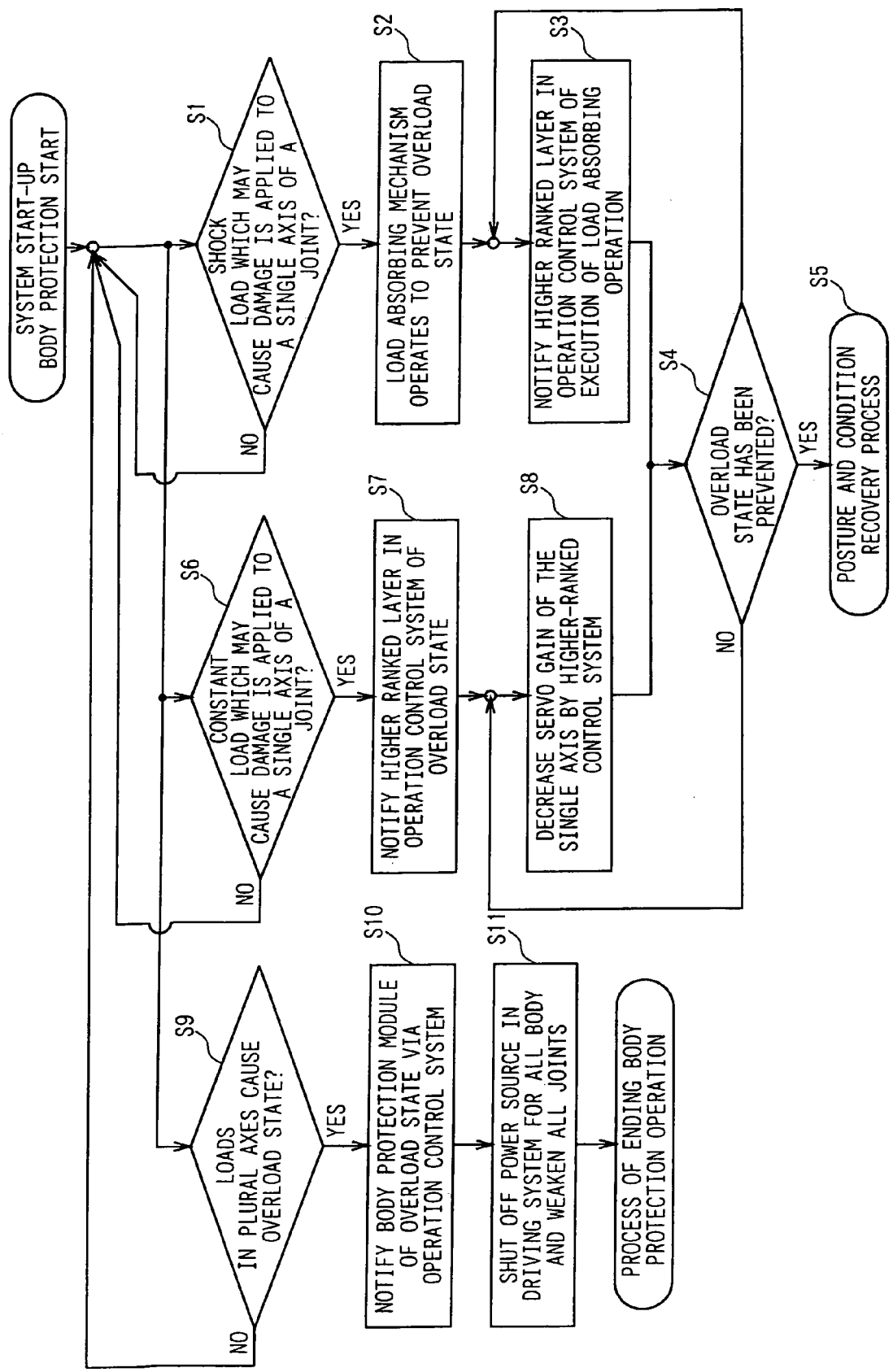
FIG. 29 is a flowchart showing a processing procedure to detect shock load and constant load in an actuator having a single axis, to detect overload in an actuator motor having plural axes, and to perform a body protection operation in response to detection of these loads.

FIG. 29 shows a flowchart for detection of a shock load and constant load in each axis of a actuator motor, the detection of overloads in multiple axes, and the body protection operation in response to detection of the above loads.

At step S1, it is detected from the evaluation function f(t) of equation (6) whether shock load which may cause damage is applied to a joint single axis.

When it is detected that shock load has been applied to an actuator, the load absorbing mechanism in the actuator operates in order to avoid the overload state at step S2. More specifically, the arithmetic processing unit 90 of the control IC 80 performs the load absorbing processing procedure RT2 shown in FIG. 26, in order to perform the PWM control on the motor current $I_{R1}$ so that the evaluation function f(t) does not exceed the second threshold value SH2.

Then, the arithmetic processing unit 90 informs the middleware layer controlling the robot's motion of the execution of the load absorbing process at step S3.

When the overload state can be avoided at step S4, a recovery process for the robot's position and condition is carried out at step S5.

Figure 30:
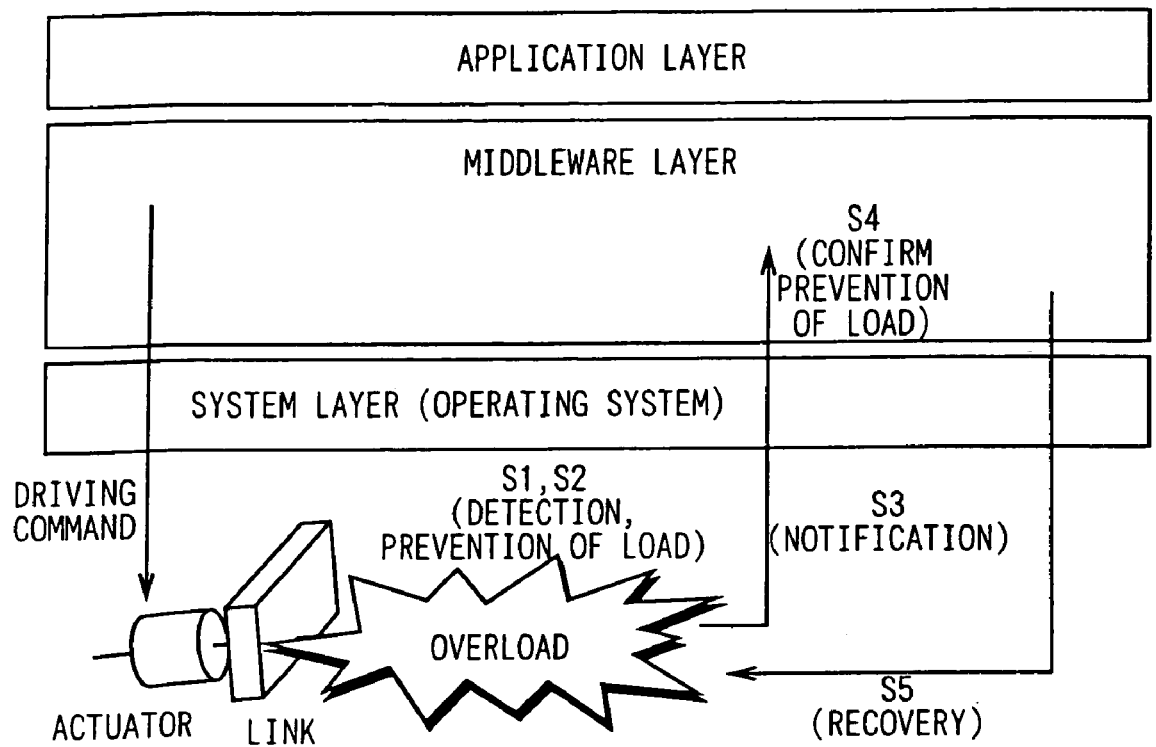
FIG. 30 is a schematic view showing an operation on software to perform a load absorbing operation and a recovery operation for a case where shock load is applied to an actuator.

FIG. 30 schematically shows an operation on software for performing the load absorbing operation and recovery operation when shock load is applied to an actuator.

When it is detected that shock load has been applied to an actuator (S1), the load absorbing mechanism (see FIG. 26) in the actuator operates, where the motor current is PWM-controlled to adjust the viscosity coefficient of the motor in order to avoid the overload state (S2). Then, the arithmetic processing unit 90 in the actuator informs the higher-ranked software, that is, the middleware layer of the operation of the load absorbing mechanism (S3). When the middleware layer determines that the overload state can be avoided (S4), it allows the actuator to perform control (S5). The actuator side carries out a position/condition recovery process and returns the viscosity coefficient of the motor to the original value.

Referring back to FIG. 29, it is determined based on the equation (2) whether a constant load which may cause damage has been applied to a joint single axis (step S6). When it is determined the constant load has been applied to an actuator, the arithmetic processing unit 90 in the actuator informs the middleware layer (see FIG. 8) controlling the robot's motion of the overload state (step S7).

The middleware layer instructs to decrease a servo gain of the actuator motor, in response to the notification (step S8).

When the overload state can be avoided (step S4), the position/condition recovery process is carried out (step S5).

Figure 31:
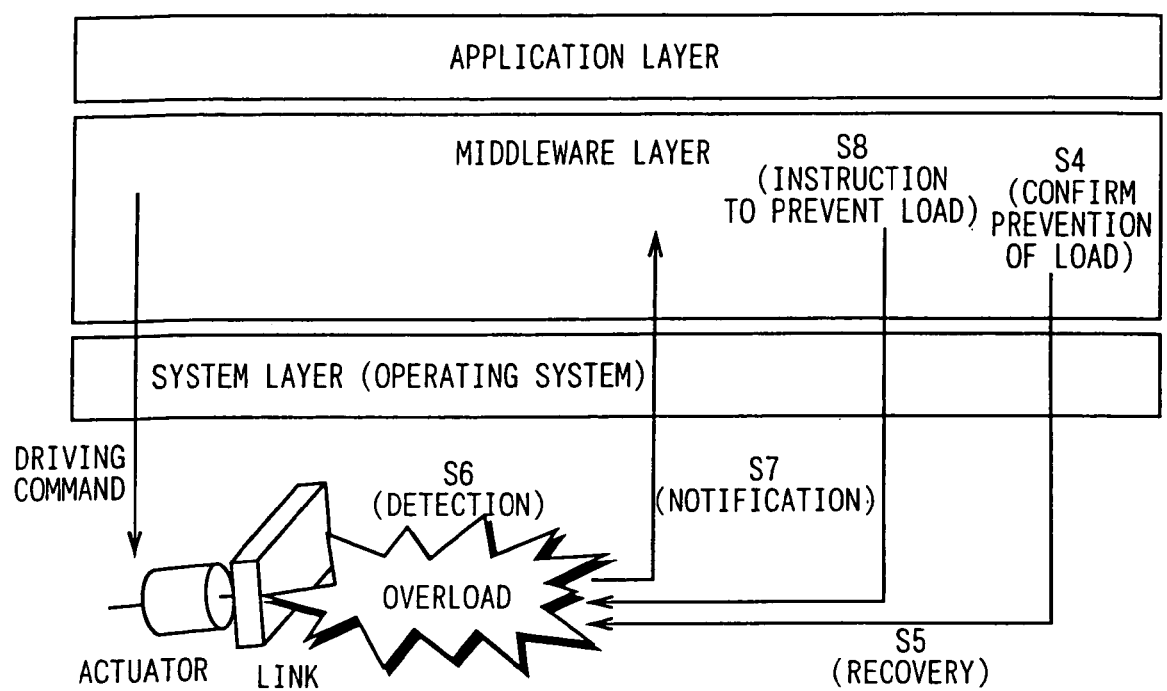
FIG. 31 is a schematic view showing an operation on software to perform a load absorbing operation and a recovery operation for a case where constant load is applied to an actuator.

FIG. 31 schematically shows an operation on software for performing the load absorbing operation and recovery operation when constant load is applied to an actuator.

When it is detected that constant load has been applied to an actuator (S6), the higher-ranked software, that is, the middleware layer is informed of this matter (S7). The middleware layer instructs to decrease the servo gain of the actuator (S8). Then when it is determined that the overload state can be avoided (S4), it allows the actuator to perform control (S5). The actuator side performs the position/condition recovery process to return the servo gain of the motor to the original value.

Referring back to FIG. 29, it is determined based on the above equation (10) or (11) that two or more joints totally come into the overload state at the same time due to loads (step S9).

Like the situation shown in FIG. 26, when an overload state is detected, the body protection module is informed of this state via the operation control system of the middleware layer.(step S10), to carry out the body protection operation (step S11).

Figure 32:
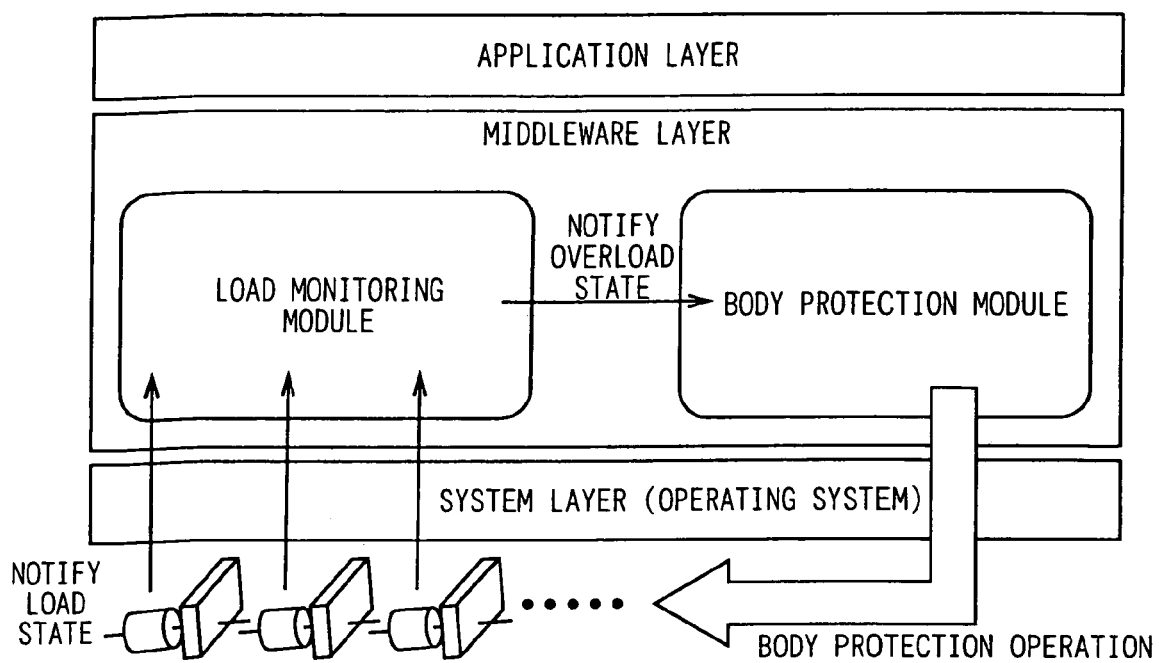
FIG. 32 is a schematic view showing a structure of the middleware layer for a case where load in a plurality of joint axes is determined to be totally excessive and a body protection operation is performed.

FIG. 32 schematically shows the structure of the middleware layer to detect an overload state in a plurality of joint axes as a whole and perform the body protection operation. As shown in this figure, the load monitoring module and the body protection module are arranged in this middleware layer.

The load monitoring module concurrently receives information on a load state (for example, a voltage value $V_i$ corresponding to a load torque) from the actuator motors $A_1$ to $A_{24}$, and detect a load state in the entire body based on the total of the values.

The body protection module carries out the body protection operation when the load monitoring module detects the overload state. For example, the body protection module shuts off power of the actuator motors of the all body or relevant parts and weakens the joints.

Figure 33:
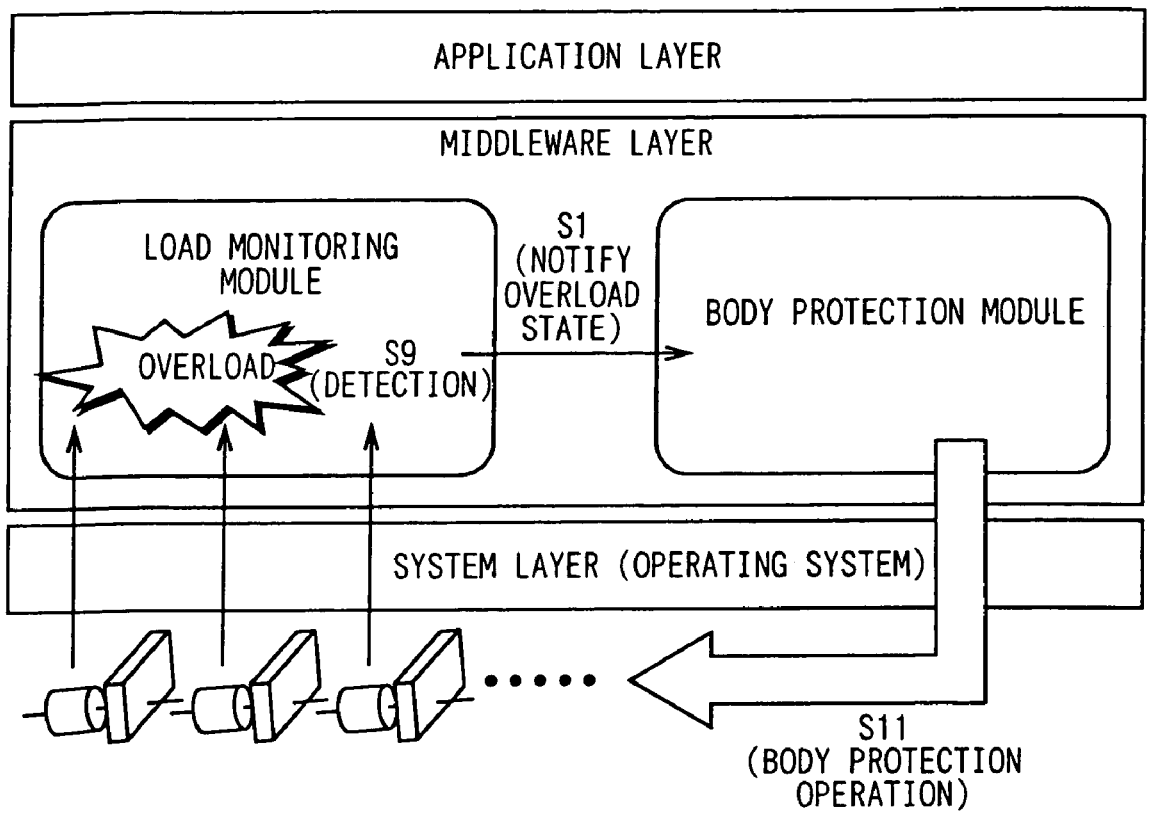
FIG. 33 is a schematic view showing an operation on software to perform a load absorbing operation and a recovery operation for a case where loads in a plurality of joint axes are totally excessive.

FIG. 33 schematically shows an operation on software to perform the load absorbing operation and the recovery operation when loads in a plurality of joint axes are totally excessive.

In the middleware layer, the load monitoring module detects an overload state in a plurality of joint axes (S9), it informs the body protection module of this state (S11). The body protection module carries out the body protection operation (S11). For example, it shuts off power to the actuator motors of the all body or to relevant parts and weakens the joints.

This invention is not limited to a "robot". That is, this application can be applied to mechanical apparatuses which use electric or magnetic functions to move like humans, or even to moving apparatuses in other industrial fields, like toys.

Further, this invention is applied to a two-legged walking type robot 1 in FIG. 1 to FIG. 5. This invention, however, is not limited to this and can be widely applied to, in addition to robots, other apparatuses having servo motors as power sources for moving parts.

Still further, this invention has described a case where a torque measuring means for calculating a sum of absolute values of a static load torque newly applied to a link connected to the output shaft 75 of an actuator $A_1$ to $A_{24}$ and the generated torque of the actuator $A_1$ to $A_{24}$ and a load absorbing control means for controlling the motor so as to reduce the generated torque when the sum exceeds the prescribed first threshold value are realized by the control IC 80 for controlling the position of the actuator $A_1$ to $A_{24}$ based on the operation command COM from the higher-ranked controller. This invention, however, is not limited to this and these means can be provided, separately from the control IC 80.

Still further, this invention has described a case where an energy measuring means for detecting the variation of energy of a dynamic load torque applied to a link connected to the output shaft 75 of an actuator $A_1$ to $A_{24}$ and a load absorbing control means for controlling the motor so as to reduce the generated torque when the variation of energy detected by the energy measuring means exceeds the prescribed second threshold value are realized by the control IC 80. However, this invention is not limited to this and these means can be provided, separately from the control IC 80.

Still further, this invention has described a case where the proportionality constants $K_i$ and $K_\theta$ in the equation (9) are set to 1.0 and 4.0, respectively, and the second threshold value SH2 is set to a value between 1.3 and 4.0 mN·m·rad/S2 which is considered optimal. This invention, however, is not limited to this and these proportionality constants $K_i$, $K_\theta$ and the second threshold value SH2 can be set to other values according to the construction of a corresponding actuator.

Still further, this invention has described a case where current $I_{R1}$ flowing in the power line LIN for the drive circuit 81 is detected as a voltage $V_i$ and the variations of energy of the static and dynamic load torques applied to a link connected to the output shaft 75 of an actuator $A_1$ to $A_{24}$ are detected based on the detected voltage $V_i$. This invention, however, is not limited to this and not the current $I_{R1}$ but another thing can be used, provided that the variations of energy of the static and dynamic load torques can be correctly obtained based on it.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A load absorbing method for absorbing load applied to a motor, comprising:
   a torque measuring step of measuring a load torque based on a sum of absolute values of a torque applied to a link connected to an output shaft of the motor and a generated torque of the motor;
   an overload detection step of determining that overload has been applied, when the load torque measured in the torque measuring step exceeds a first threshold value for a prescribed period of time or longer;
   a load absorbing control step of controlling a process to absorb the overload in the motor when the overload is detected in the overload detection step; and
   a step for walking with moving two legs when the overload in the motor is absorbed in the load absorbing control step.

* * * * *